United States Patent
Le-Chau et al.

(10) Patent No.: US 10,701,422 B2
(45) Date of Patent: *Jun. 30, 2020

(54) SYSTEMS AND METHODS FOR PROVISIONING MULTI-DIMENSIONAL RULE BASED ENTITLEMENT OFFERS

(71) Applicant: The DIRECTV Group, Inc., El Segundo, CA (US)

(72) Inventors: Luan Le-Chau, Los Angeles, CA (US); Cuong T Ly, Westminster, CA (US); Raynold M. Kahn, Los Angeles, CA (US); Ranny Q. Sue, Laguna Niguel, CA (US); Kapil Chaudhry, San Ramon, CA (US); Joel M. Pamplona, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,835

(22) Filed: Jan. 29, 2019

(65) Prior Publication Data

US 2019/0158903 A1 May 23, 2019

Related U.S. Application Data

(63) Continuation of application No. 15/266,539, filed on Sep. 15, 2016, now Pat. No. 10,264,304, which is a
(Continued)

(51) Int. Cl.
*H04N 21/262* (2011.01)
*H04N 21/458* (2011.01)
(Continued)

(52) U.S. Cl.
CPC ....... *H04N 21/262* (2013.01); *H04N 21/2541* (2013.01); *H04N 21/26225* (2013.01);
(Continued)

(58) Field of Classification Search
CPC .............. H04N 21/262; H04N 21/458; H04N 21/26225; H04N 21/2541; H04N 21/6334; H04N 21/6143; H04N 21/6193
See application file for complete search history.

(56) References Cited

U.S. PATENT DOCUMENTS

| 4,322,745 A | 3/1982 | Saeki et al. |
| 4,694,490 A | 9/1987 | Harvey et al. |

(Continued)

FOREIGN PATENT DOCUMENTS

| EP | 1176826 A2 | 1/2002 |
| EP | 1176827 A2 | 1/2002 |

(Continued)

OTHER PUBLICATIONS

International Search Report and Written opinion dated Jun. 10, 2013 in International Application No. PCT/US2013/025047 filed Jan. 7. 2013 by Kapil Chaudhry et al.
(Continued)

*Primary Examiner* — Oschta I Montoya
(74) *Attorney, Agent, or Firm* — Harness, Dickey & Pierce, P.L.C.

(57) ABSTRACT

A method of provisioning entitlement including: receiving within a headend and at a policy management module first conditions and rules for content from a service provider or a third party device; and generating, for a point of presence (POP) device of a customer, a policy for entitlement and usage of content (merged policy). The generating of the merged policy includes: merging conditions and rules of policies including the first conditions and rules to generate the merged policy based on a predetermined hierarchy of the policies. Rules and conditions of the merged policy are multi-dimensional to include customer, POP device, and provider dimensions; and generating a configuration file including conditions or condition based parameters. The
(Continued)

method further includes: presenting an offer for the content to the customer via the POP device; receiving an acceptance of the offer from the POP device; and enforcing the merged policy according to the configuration file.

20 Claims, 15 Drawing Sheets

Related U.S. Application Data continuation of application No. 14/871,835, filed on Sep. 30, 2015, now Pat. No. 9,467,726.

(51) Int. Cl.
*H04N 21/254* (2011.01)
*H04N 21/61* (2011.01)
*H04N 21/6334* (2011.01)

(52) U.S. Cl.
CPC ....... *H04N 21/458* (2013.01); *H04N 21/6143* (2013.01); *H04N 21/6193* (2013.01); *H04N 21/6334* (2013.01)

(56) References Cited

U.S. PATENT DOCUMENTS

| | | |
|---|---|---|
| 5,301,245 A | 4/1994 | Endoh |
| 5,421,031 A | 5/1995 | De Bey |
| 5,442,389 A | 8/1995 | Blahut et al. |
| 5,506,902 A | 4/1996 | Kubota |
| 5,544,161 A | 8/1996 | Bigham et al. |
| 5,701,582 A | 12/1997 | DeBey |
| 5,734,853 A | 3/1998 | Hendricks et al. |
| 5,878,141 A | 3/1999 | Daly et al. |
| 5,917,481 A | 6/1999 | Rzeszewski et al. |
| 6,115,074 A | 9/2000 | Ozkan et al. |
| 6,175,362 B1 | 1/2001 | Harms et al. |
| 6,229,540 B1 | 5/2001 | Tonelli et al. |
| 6,253,375 B1 | 6/2001 | Gordon et al. |
| 6,289,314 B1 | 9/2001 | Matsuzaki et al. |
| 6,289,455 B1 | 9/2001 | Kocher et al. |
| 6,381,747 B1 | 4/2002 | Wonfor et al. |
| 6,424,717 B1 | 7/2002 | Pinder et al. |
| 6,510,519 B2 | 1/2003 | Wasilewski et al. |
| 6,519,693 B1 | 2/2003 | Debey |
| 6,529,680 B1 | 3/2003 | Broberg |
| 6,543,053 B1 | 4/2003 | Li et al. |
| 6,574,795 B1 | 6/2003 | Carr |
| 6,636,966 B1 | 10/2003 | Lee et al. |
| 6,748,080 B2 | 6/2004 | Russ et al. |
| 6,792,618 B1 | 9/2004 | Bendinelli et al. |
| 6,801,528 B2 | 10/2004 | Nassar |
| 6,816,596 B1 | 11/2004 | Peinado et al. |
| 6,824,051 B2 | 11/2004 | Reddy et al. |
| 6,839,757 B1 | 1/2005 | Romano et al. |
| 6,885,660 B2 | 4/2005 | Inbar et al. |
| 6,889,208 B1 | 5/2005 | Okabe et al. |
| 6,934,963 B1 | 8/2005 | Reynolds et al. |
| 6,961,858 B2 | 11/2005 | Fransdonk |
| 6,983,319 B1 | 1/2006 | Lu et al. |
| 6,993,499 B2 | 1/2006 | Gagnon et al. |
| 6,993,782 B1 | 1/2006 | Newberry et al. |
| 7,003,791 B2 | 2/2006 | Mizutani |
| 7,016,498 B2 | 3/2006 | Peinado et al. |
| 7,027,460 B2 | 4/2006 | Iyer et al. |
| 7,032,236 B1 | 4/2006 | Ozkan et al. |
| 7,035,827 B2 | 4/2006 | Ezaki |
| 7,054,447 B1 | 5/2006 | Price, III |
| 7,069,312 B2 | 6/2006 | Kostic et al. |
| 7,073,073 B1 | 7/2006 | Nonaka et al. |
| 7,137,006 B1 | 11/2006 | Grandcolas et al. |
| 7,191,335 B1 | 3/2007 | Maillard |
| 7,194,757 B1 | 3/2007 | Fish et al. |
| 7,194,759 B1 | 3/2007 | Chess et al. |
| 7,203,311 B1 | 4/2007 | Kahn et al. |
| 7,320,140 B1* | 1/2008 | Boyer ................ H04N 21/2541 375/E7.009 |
| 7,327,931 B2 | 2/2008 | Frantz |
| 7,356,584 B2 | 4/2008 | Yip |
| 7,370,342 B2 | 5/2008 | Ismail et al. |
| 7,496,540 B2 | 2/2009 | Irwin et al. |
| 7,546,623 B2 | 6/2009 | Ramraz et al. |
| 7,668,838 B2 | 2/2010 | Baio et al. |
| 7,895,341 B2 | 2/2011 | Schlacht et al. |
| 8,001,565 B2 | 8/2011 | Kahn et al. |
| 8,745,654 B1 | 6/2014 | Chaudhry et al. |
| 2001/0037452 A1 | 11/2001 | Go et al. |
| 2001/0047516 A1 | 11/2001 | Swain et al. |
| 2002/0019984 A1 | 2/2002 | Rakib |
| 2002/0026640 A1 | 2/2002 | Graan |
| 2002/0026643 A1 | 2/2002 | Ewen et al. |
| 2002/0051539 A1 | 5/2002 | Okimoto et al. |
| 2002/0054752 A1 | 5/2002 | Wood et al. |
| 2002/0056118 A1 | 5/2002 | Hunter et al. |
| 2002/0067914 A1 | 6/2002 | Schumann et al. |
| 2002/0095679 A1 | 7/2002 | Bonini |
| 2002/0198846 A1 | 12/2002 | Lao |
| 2003/0031184 A1 | 2/2003 | Cunetto et al. |
| 2003/0037006 A1 | 2/2003 | Maruyama et al. |
| 2003/0046702 A1 | 3/2003 | Sasaki |
| 2003/0066884 A1 | 4/2003 | Reddy et al. |
| 2003/0095791 A1 | 5/2003 | Barton et al. |
| 2003/0121047 A1 | 6/2003 | Watson et al. |
| 2003/0163684 A1* | 8/2003 | Fransdonk ............. G06Q 20/12 713/153 |
| 2003/0167392 A1 | 9/2003 | Fransdonk |
| 2003/0188316 A1 | 10/2003 | DePrez |
| 2003/0212997 A1 | 11/2003 | Hejna |
| 2004/0034771 A1 | 2/2004 | Edgett et al. |
| 2004/0039905 A1 | 2/2004 | Leoutsarakos |
| 2004/0049796 A1 | 3/2004 | Briggs |
| 2004/0078828 A1 | 4/2004 | Parchman et al. |
| 2004/0083487 A1 | 4/2004 | Collens et al. |
| 2004/0117430 A1 | 6/2004 | Bazot et al. |
| 2004/0139480 A1 | 7/2004 | Delpuch et al. |
| 2004/0177369 A1 | 9/2004 | Akins |
| 2004/0233897 A1 | 11/2004 | Yamaguchi et al. |
| 2004/0237100 A1 | 11/2004 | Pinder et al. |
| 2004/0250293 A1 | 12/2004 | Ryal et al. |
| 2005/0050333 A1 | 3/2005 | Yeap et al. |
| 2005/0055724 A1 | 3/2005 | Atad et al. |
| 2005/0066353 A1 | 3/2005 | Fransdonk |
| 2005/0086173 A1 | 4/2005 | Kalwit |
| 2005/0086683 A1 | 4/2005 | Meyerson |
| 2005/0102506 A1 | 5/2005 | Pica et al. |
| 2005/0125540 A1 | 6/2005 | Szu et al. |
| 2005/0152287 A1 | 7/2005 | Yokomitsu et al. |
| 2005/0235361 A1 | 10/2005 | Alkove et al. |
| 2005/0262573 A1 | 11/2005 | Bo et al. |
| 2006/0031472 A1 | 2/2006 | Rajavelu et al. |
| 2006/0036847 A1 | 2/2006 | Bush et al. |
| 2006/0037037 A1 | 2/2006 | Miranz |
| 2006/0046744 A1 | 3/2006 | Dublish et al. |
| 2006/0056397 A1 | 3/2006 | Aizu et al. |
| 2006/0117342 A1 | 6/2006 | Park et al. |
| 2006/0120309 A1 | 6/2006 | Bigras et al. |
| 2006/0168663 A1 | 7/2006 | Viljoen et al. |
| 2006/0174127 A1 | 8/2006 | Kalavade et al. |
| 2006/0179489 A1 | 8/2006 | Mas Ribes |
| 2006/0195881 A1 | 8/2006 | Segev et al. |
| 2006/0218620 A1 | 9/2006 | Nadarajah et al. |
| 2006/0242322 A1 | 10/2006 | Williams et al. |
| 2007/0021053 A1 | 1/2007 | Marrah |
| 2007/0067806 A1 | 3/2007 | Russell et al. |
| 2007/0094697 A1* | 4/2007 | Weigand ............ H04N 7/17318 725/126 |
| 2007/0100701 A1 | 5/2007 | Boccon-Gibod et al. |
| 2007/0124602 A1 | 5/2007 | Wald et al. |
| 2007/0130286 A1 | 6/2007 | Hopmann et al. |
| 2007/0160142 A1 | 7/2007 | Abrams |
| 2007/0160198 A1 | 7/2007 | Orsini et al. |
| 2007/0162748 A1 | 7/2007 | Okayama et al. |
| 2007/0214103 A1 | 9/2007 | Manthoulis |

(56) References Cited

U.S. PATENT DOCUMENTS

| | | |
|---|---|---|
| 2007/0217434 A1 | 9/2007 | Welbourn |
| 2007/0233879 A1 | 10/2007 | Woods et al. |
| 2007/0240193 A1 | 10/2007 | Sie et al. |
| 2007/0265970 A1 | 11/2007 | Kahn et al. |
| 2007/0266026 A1 | 11/2007 | Aravamudan et al. |
| 2007/0274327 A1 | 11/2007 | Kaarela et al. |
| 2008/0098450 A1 | 4/2008 | Wu et al. |
| 2008/0112405 A1 | 5/2008 | Cholas et al. |
| 2008/0235513 A1 | 9/2008 | Foster et al. |
| 2008/0256615 A1 | 10/2008 | Schlacht et al. |
| 2009/0129301 A1 | 5/2009 | Belimpasakis |
| 2009/0164579 A1 | 6/2009 | Chaudhry |
| 2009/0207905 A1 | 8/2009 | Tomita |
| 2009/0216623 A1 | 8/2009 | Hendricks et al. |
| 2010/0175092 A1 | 7/2010 | Kikinis et al. |
| 2010/0180322 A1 | 7/2010 | Finn et al. |
| 2010/0241748 A1 | 9/2010 | Ansari et al. |
| 2011/0093900 A1 | 4/2011 | Patel et al. |

FOREIGN PATENT DOCUMENTS

| | | |
|---|---|---|
| WO | WO-99/18729 A1 | 4/1999 |
| WO | WO-2007/074359 A1 | 7/2007 |

OTHER PUBLICATIONS

UPNP-hacks; http://www.upnp-hacks.org/igd.html; 2006-2011.
Selen, Kristian; "UPnP Security in Internet Gateway Devices"; 2006; retrieved from http://www.tml.tkk.fi/Publications/C/21/Selen_ready.pdf.
Secure Sockets Layer (SSL); 2000; retrieved from http://www.searchsecurity.techtarget.com/definition/Secure-Sockets-Layer-SSL.
Fielder, Jens; Kupka, Thomas; Magedanz, Thomas; Kleis, Michael; "reliable VoIP Services Using at Peer-to-Peer Intranet"; Proceesings of the Eighth IEEE International Symposium on Multimedia(ISM 2006).
WANIPConnection: 1 Service Template Version 1.01; for UPnPVersion 1.0; Nov. 2001.
Foldoc definition of HTTP; 2010; retrieved from http://www.foldoc.org.
Warrier, Ulhas and Iyer, Prakash; WANDevice:1 Device Template Version 1.01 for UPnP Version 1.0; Nov. 12, 2001; pp. 1-12.
Pennerath, Frederic; Marynissen, Gert; "WANConnectionDevice: 1 Device Template Version 1.01"; UPNP Forum; Nov. 12, 2001; XP002521778; retrieved from the internet: URL:http//www.upnp.org/standardizeddcps/documents/UPnP_IGD_WANDevice%201.0.pdf; Section 2.4.16.
Contributors: Allegro Software Development Corporation, Conexant Systems, Inc., Intel Corporation, Microsoft Corporation, Motorola, Nokia Corporation, Philips Electronics, Pioneer, Sony Electronics; "UPnP Device Architecture 1.0"; UPNP Forum; Jul. 20, 2006; XP002521777; retrieved from the internet: URL:http://www.upnp-ic.org/resources/UPnP_device_architecture_docs/UPnP-DeviceArchitecture-v1_0-20060720.pdf; p. 3, lines 8-18.
Vogel, Hans; Weyl, Benjamin; Eichlet, Stephan; "Federation Solutions for Inter-and Intradomain Security in Next-Generation Mobile Services Platforms"; AEU International Journal of Electronics and Communications; Elsevier, Jena, DE; vol. 60, No. 1; Jan. 2, 2006; pp. 13-19; XP025183729; ISSN: 1434-8411 [retrieved on Jan. 2, 2006].
Tsubakiyama, Hideki and Koga, Keiichiro; "Security for Information Data Broadcasting System with Conditional-Access Control"; IEEE; 1993; pp. 164-170.
EBU Project Group B/CA; "Functional Model of a Conditional Access System"; EBU Technical Review; Jun. 10, 1995; pp. 64-77.
Ma, Huang and Shin, Kang G.; "Multicast Video on Demand Services"; ACM SIGCOMM Computer Communications Review; vol. 32, Issue 1; Jan. 2002; pp. 31-43; ACM Press; New York, New York US.
Tantaoui, Mounir A.; Hua, Kien A.I Sheu, Simon; "Interaction with Broadcast Video"; International Multimedia Conference Proceedings of the 10th ACM International Conference on Multimedia; pp. 29-38; ACM Press; New York, New York, US; 2002 ISBN: 1-58113-620-X.
Griwodz, Carsten; Merkel, Oliver; Dittmann, Jana; Steinmetz, Ralf; "Protecting VoD the Easier Way"; International Multimedia Conference Proceedings of the 6th ACM International Conference on Multimedia; pp. 21-28; ACM Press; New York, New York, US; 2002 ISBN: 0-201-30990-4.
Anonymous; "PKCS #1 v2.1: RSA/Cryptography Standard"; Jun. 14, 2002; RSA Laboratories; 61 pages.

* cited by examiner

SYSTEMS AND METHODS FOR PROVISIONING MULTI-DIMENSIONAL RULE BASED ENTITLEMENT OFFERS

CROSS-REFERENCE TO RELATED APPLICATIONS

This application is a continuation of U.S. patent application Ser. No. 15/266,539 filed on Sep. 15, 2016. This application claims the benefit of U.S. patent application Ser. No. 14/871,835 filed on Sep. 30, 2015. The entire disclosure of the above application is incorporated herein by reference.

TECHNOLOGY FIELD

The present disclosure relates generally to content distribution systems and, more specifically, to systems and methods for enabling provisioning of complex rules with regard to entitlement to support providing services to fill consumer requests for content.

BACKGROUND

The statements in this section merely provide background information related to the present disclosure and may not constitute prior art.

Satellite television has become increasingly popular due to a wide variety of content and the quality of content available. A satellite television system typically includes a set top box that is used to receive satellite signals and decode the satellite signals for use on a television. The set top box typically has a memory associated therewith. The memory may include a digital video recorder or the like as well as storage for an operating code of the set top box.

Content providers provide a variety of content to consumers. The content may be provided in the form of audio, video, movies, etc. Available content is typically received at a set top box (or user receiving device) and displayed to the user using a guide. The guide typically includes channels and timeslots as well as programming information for each information timeslot. The programming information may include the content title and other identifiers such as actor information and the like. The user selects a channel via the guide and the set top box (STB) then displays the channel on a display (e.g., a television).

Customers (or users) of a service provider can subscribe to various packages. Each of the packages provides access to a certain set of channels. The customers call the service provider to establish an account with the service provider. While setting up an account, a customer selects a package and provides billing information to the service provider. The customer is then able to access channels in the selected package.

In addition to the channels in a selected package that a customer is signed up to receive, the customer may also receive additional content. This may include the customer selecting a channel, program and/or video via the STB and/or again calling the service provider to request for the selected channel, program and/or video. For example, a customer may request a video, obtain authorization to receive the video, and receive the video at a STB of the customer. This is often referred to as pay-per-view (PPV). The video is transmitted to the STB and may then be displayed on a display (or television) of the STB. The customer may control when the video is displayed.

SUMMARY

The present disclosure provides systems and methods for providing content access based on quick response codes and text messages.

In one aspect of the disclosure, a method of provisioning multi-dimensional rule based entitlement is provided. The method includes: receiving within a headend and at a policy management module first conditions and rules for content from a service provider or a third party device; and generating, for a point of presence device of a customer, a policy for entitlement and usage of content. The generating of the policy for entitlement and usage of content includes: merging conditions and rules of policies including the first conditions and rules to generate the policy for entitlement and usage of content based on a predetermined hierarchy of the policies, where rules and conditions of the policy for entitlement and usage of content are multi-dimensional to include a customer dimension, a point of presence device dimension, and a provider dimension; and generating a configuration file including conditions or condition based parameters. The method further includes: presenting an offer for the content to the customer via the point of presence device; receiving an acceptance signal indicating acceptance of the offer from the point of presence device; and enforcing the policy for entitlement and usage of content according to the configuration file.

In another aspect, a system for provisioning multi-dimensional rule based entitlement is provided. The system includes a policy management module, an authorization module and a conditional access management module. The policy management module is configured to: receive first conditions and rules for content from a service provider or a third party device, wherein the policy management module is within a headend; and generate, for a point of presence device of a customer, a policy for entitlement and usage of content. The generating of the policy for entitlement and usage of content includes: merging conditions and rules of policies including the first conditions and rules to generate the policy for entitlement and usage of content based on a predetermined hierarchy of the policies, where rules and conditions of the policy for entitlement and usage of content are multi-dimensional to include a customer dimension, a point of presence device dimension, and a provider dimension, and generating a configuration file including conditions or condition based parameters. The authorization module is configured to present an offer for the content to the customer via the point of presence device, and receive an acceptance signal indicating acceptance of the offer from the point of presence device. The conditional access management module is configured to enforce the policy for entitlement and usage of content according to the configuration file.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
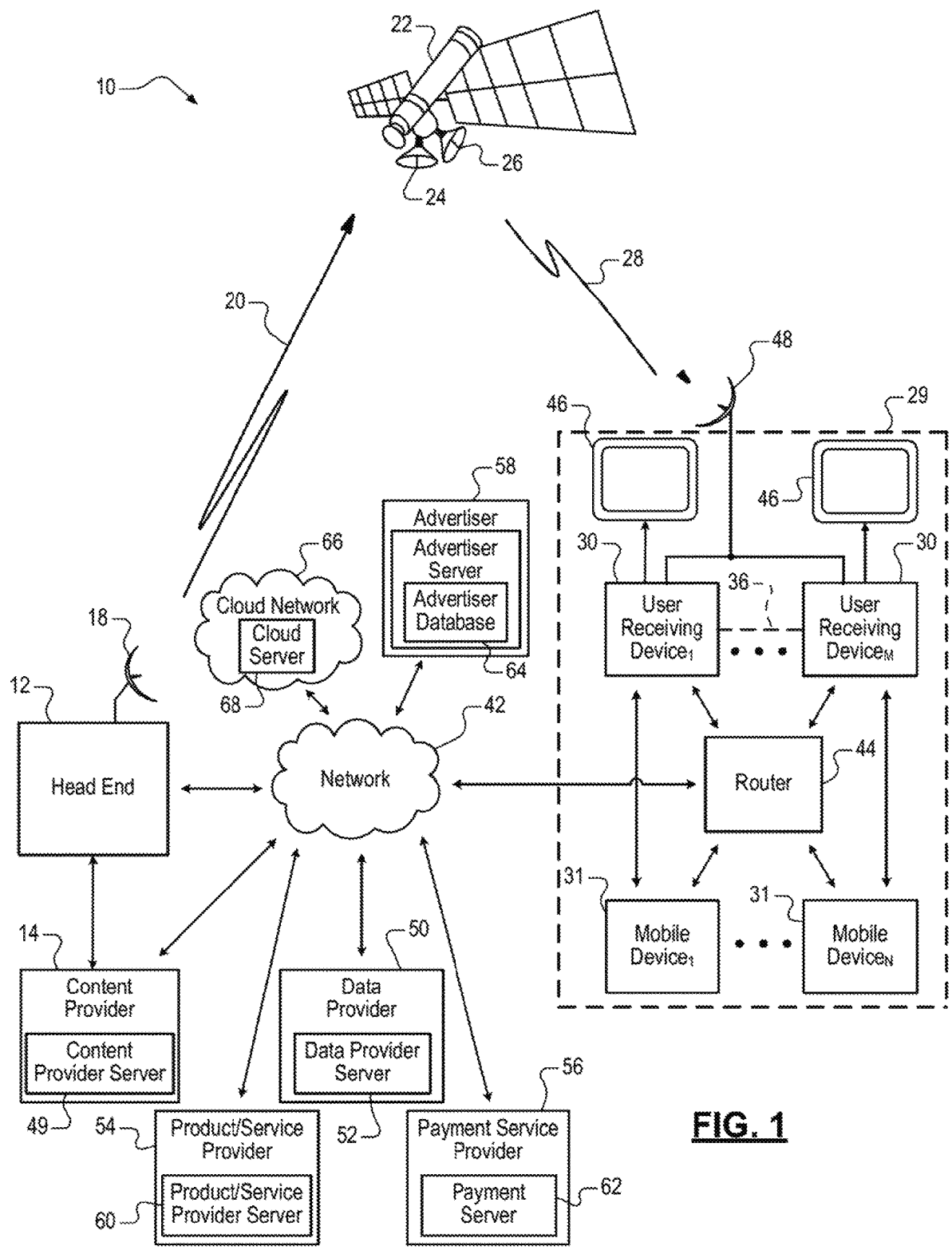
FIG. 1 is a functional block diagram of a communication system in accordance with the present disclosure.

A set-top-box (STB) may receive an audio/video input signal via a cable network or a satellite and direct the audio-video input to a television (or other display). A user may interact with the STB via a remote control device, a cellular phone or other mobile device in order to view a guide and/or programs on the television and manage usage of the STB. The terms "user", "viewer", and "customer" are used herein interchangeably and may refer to the same person. Transactions between the user and a service provider may be performed via the STB, the mobile device and/or other point of presence (POP) device. The transactions may be associated with services being provided by the service provider to the POP devices. The services may include, for example, programs, audio tracks, videos, and/or pay-per-view (PPV) products. Various types of products (or content) may be offered including (i) pay-to-rent content such as video-on-demand (VOD) content, and (ii) pay-to-own content such as electronic sell through (EST) content (e.g., standard definition (SD), high-definition (HD) and/or 4K (referred to sometimes as ultra-high definition) formats).

Accessing and viewing a digital video such as a movie, a TV show, a channel or an on-air program of a channel streamed over the Internet is subjected to ever more complex rules that are dictated by systems of a service provider and/or contractual agreements with third party content providers, especially on premium content provided by major studios. A traditional model of purchasing and using physical media (e.g., DVD and BluRay® discs) for a movie or a TV series includes a user purchasing the physical media and viewing the physical media as many times as a user wants. The physical media can be passed around to be played on any DVD/BluRay® player. In contrast, distribution of content, such as that on physical media, digitally over the Internet is subjected to complex conditions. Examples of the conditions are: viewing windows (e.g., must watch within 30 days of purchase or rent, and 48 hours when viewing is started); a limited number of concurrent viewing (or streaming) sessions to users' devices per account or household (e.g., no more than 3 concurrent streaming sessions of the same movie title on devices of family members such as father's, mother's and daughter's); a limited number of devices per account (e.g., no more than 5 registered devices can be allowed to stream or download a movie title); device class or type specific (e.g., can only be watched on iOS® 7 and Android® 5 or a newer version); geographical location specific (e.g., zip code based, U.S. only, not within one mile radius of a stadium during a live broadcast of the purchased event such as a game or concert, etc.); blackout conditions (e.g., cannot watch during (e.g., holiday season, or when the content is in DVD/BluRay® re-sale window etc.); user profile specific (e.g., only subscribers of premium channels such as HBO®, Cinemax® can get three free VOD movies for the months of August and September); and other conditions. Many of these conditions and corresponding rules can be content provider specific, i.e. different content providers might have different sets of rules for their content.

As a result, the conditions and rules and/or combination thereof can get very complex and it can be difficult to implement a decision process to grant authorization and enforce entitlement of some content to a user. The examples disclosed introduce entitlement policies and provide methods and systems for implementing the entitlement policies. The methods and systems provide flexibility and extensibility to incorporate complex conditions and rules in formulating offers (e.g., a VOD title for streaming and downloading, a package of three episodes of a series, a whole series, a package of premium channels such as HBO®/Cinemax®/Starz® with three free VOD movie titles, etc.).

The conditions and rules associated with an offer are enforced as a combination. Intersections and/or unions of the conditions and rules are addressed and a hierarchy of the conditions and rules with orders of precedence is followed. Override procedures are also implemented. This is done without having to manually implement (code) each time there's a new rule or changes to existing rules. Entitlement policies may be created as metadata files and associated with offers and may be edited and interpreted. Authentication or enforcing modules may interpret the entitlement policies to authorize viewing entitlement to a user on content referred to in an offer. This provides a data driven system.

The following disclosed examples provide provisioning of multi-dimensional rule based entitlement offers for ownership, rental and subscription of broadband delivered video content to POP devices, such as consumer devices, mobile devices (e.g., laptop computers, smart telephones, and tablets), URDs, set-top-boxes (STBs) media gateway devices, personal computers, smart televisions, etc. A POP is a network operation center or data center that may be located in various geographical locations. POP devices of a customer may be located in one or more rooms, floors, buildings and/or geographical locations. The examples enable multiple entitlement offers of on-demand content to be delivered from systems of a service provider, such as one or more systems within one or more headends over terrestrial and direct broadcast networks.

As an example, the headends, content providers, and service providers may provide various types of content including programs, videos, and PPV content. Advertisers may advertise products (e.g., consumer products), services (e.g., residential or business services, legal services, medical services, etc.), programs (e.g., broadcast channels, concerts, sporting events, etc.), videos, PPV content (e.g., videos, sporting events, etc.), and/or other items that can be advertised. The products may include the programs, videos, PPV content, and/or other content. The consumer products may include food and/or drink products, residential products, business products, vehicles, and/or other products. The advertisements may advertise content provided by a content provider and/or products and services offered for purchase by other product and/or service providers.

The disclosed examples allow for various types of content to be offered including: pay-to-own content such as movies and television shows; permanent viewing access rights to content, where unlimited viewing time has been paid by a customer; pay-to-rent content, such as movies and TV shows, where a finite duration of viewing access rights to content is provided and a limited viewing time is paid for by a customer; and/or subscription of on-demand content, where a customer has viewing access to a library or collection of content for a recurring fee. The disclosed examples provide: expected value to product offerings by allowing for the flexibility to package product offers of a digital asset or programming content; expanding service provider product offer availability on new types of consumer electronic devices; and increasing revenue of on-demand content on a transactional or subscription basis. The disclosed methods may be broadly applied to packaging and provisioning of entitlement offers for viewing consumption of network distributed digital goods and/or assets over a wide range of consumer electronics devices and/or appliances.

A service provider may offer VOD, live streaming, C3, 4K, and other capabilities across a variety of platforms including iOS®, Android®, PC/Mac, and STB. Which platform each capability is enabled on and all conditions and rules for the capability may be embedded in and/or shared among devices and/or modules of the systems providing the capability. The number of capabilities, features, and offerings can continue to increase. This increase in capabilities, features and offerings can require a large amount of coordination and development. Leveraging capabilities from one feature into another feature requires project planning and development including multiple phases. The disclosed examples allow for new capabilities, features, rules, and offers to be introduced and implemented without requiring updating software coding and/or development. The disclosed examples allow mixing and matching of capabilities, features, rules, conditions and offers to provide new and/or updated offers and/or capabilities.

FIG. 1 shows a communication system 10 that includes a headend 12. The headend 12 operates as a content processing system and a transmission source. The headend 12 may also be used for distributing content and providing billing data. The details of the headend 12 will be further described below with respect to FIG. 2.

One or more content providers 14, only one of which is illustrated in FIG. 1, may provide content and data related to the content such as metadata to the headend 12. The content providers 14 may individually and/or collectively be referred to as a content service provider. The content may include channels, programs, videos and/or other content. The metadata may include ratings data. Ratings data may include Motion Picture Association ratings such as G, PG, PG-13, R, NC-17 and X. Ratings data may also include television ratings such as TV-Y, TV-Y7, TV-G, TV-PG, TV-14, and TV-MA. Of course, different countries may have different rating systems. The headend 12 receives various types of content and data from the content provider 14 and communicates the content to various user devices associated with the system.

The headend 12 may communicate content to users in various manners including a satellite system and through terrestrial networks. Carrying through with the satellite example, the headend 12 includes an antenna 18 for communicating process content through uplink signals 20 to a satellite 22. The satellite 22 may include a receiving antenna 24 and a transmitting antenna 26. The receiving antenna 24 receives the uplink signals 20 from the satellite antenna 18. The transmitting antenna 26 generates downlink signals 28 and communicates the downlink signals 28 to various POP devices, such as user receiving devices 30 and/or mobile devices 31. The user receiving devices 30 may be implemented as and/or include set top boxes.

The headend 12 may be connected to the user receiving devices 30 via the network 42 and/or the router 44. The network 42 may be a single network or a combination of different types of networks. For example, the network 42 may be a broadband wired network, a digital subscriber line (DSL) network, and/or a wireless network. A broadband wired network may be an Ethernet network or a phone line network. The network 42 may be a one-way network such that data may be communicated from the user receiving devices 30 to the headend 12. The network 42 may also be a two-way network that delivers content from the headend 12 in response to selection signals communicated from the user receiving devices 30. The network 42 may be in communication with the local area network 36. The network 42 may include an Internet.

The user receiving devices 30 may include and/or be connected to displays 46 (e.g., televisions), as shown. The displays 46 may display both video signals and output audio signals. The user receiving devices 30 may be referred to as fixed (or non-mobile) user devices because the user receiving devices are intended to be used from a fixed position on the surface of the earth. The user receiving devices 30 may include circuitry to tune, decode and store content therein. Details of the user receiving devices 30 are further described below.

The user receiving devices 30 may be in communication with each other through a network 36 such as a local area network. Content may be stored in one or more of the user receiving devices 30 and/or in a memory separate from the user receiving devices 30 and accessed by the user receiving devices 30. The content may be shared by and/or transmitted between the user receiving devices 30. The user receiving devices 30 may be located in respective rooms of a building (an example of which is designated 29), such as a home, multi-unit dwelling or business. The content may be delivered to two or more of the user receiving devices 30 during a same period of time in a multi-room viewing function. The user receiving devices 30 may be associated with one or more accounts.

The user receiving devices 30 are in communication with an antenna 48. The antenna 48 receives the downlink signals 28. Thus, the user receiving devices 30 may be referred to as satellite television receiving devices. However, the system has applicability in non-satellite applications, such as in wired or wireless terrestrial systems. The user receiving devices 30 may be included in and/or implemented as televisions, set top boxes, and/or set back boxes and thus may be referred to as fixed (or non-mobile devices). The user receiving devices 30 may be referred to as televisions, set top boxes, and/or set back boxes. The user receiving devices 30 may be interconnected.

The user receiving devices 30 may be connected to the router 44 and/or may be in communication with the network 42 and the mobile devices 31. The mobile devices 31 may be cellular phones, smart phones (i.e. have Internet access), dumb phones (i.e. do not have Internet access), tablets, laptops, wearable device, etc. A wearable device may be one of a number of types of devices that are worn by a user. A wearable device may be fixed wearable by a user meaning the wearable device is meant to be fixed to the user. Examples of wearable devices include a computerized watch such as a Samsung® or Apple® watch. The watch devices are fixed to an arm of the user. Another example of a wearable device is GOOGLE GLASS®, which is fixed to a head of a user. Of course, other types of wearable devices affixed to other parts of the body may be used. A wearable device may be in direct communication with the user receiving devices 30 through Bluetooth® connections. As described below, the user receiving devices 30 and the mobile devices 31 may include Bluetooth® transceivers (referred to as radios). The mobile devices 31 may also be in communication with the user receiving devices 30 via Internet protocol (IP) connections and/or the router 44. The mobile devices 31 may also be in communication with devices (e.g., the headend 12) outside the local area network via the router 44 and/or the network 42. As used herein, a mobile device may refer to a mobile phone, a tablet, a remote control device, a wearable device, etc.

The router 44 may be a wireless router or a wired router or a combination of the two. For example, the user receiving devices 30 may be wired to the router 44 and wirelessly coupled to the mobile devices 31. The router 44 may communicate IP signals to the user receiving devices 30. The IP signals may be used for controlling various functions of the user receiving devices 30. IP signals may also originate from the user receiving devices 30 and be transmitted to the mobile device 31.

Figure 5:
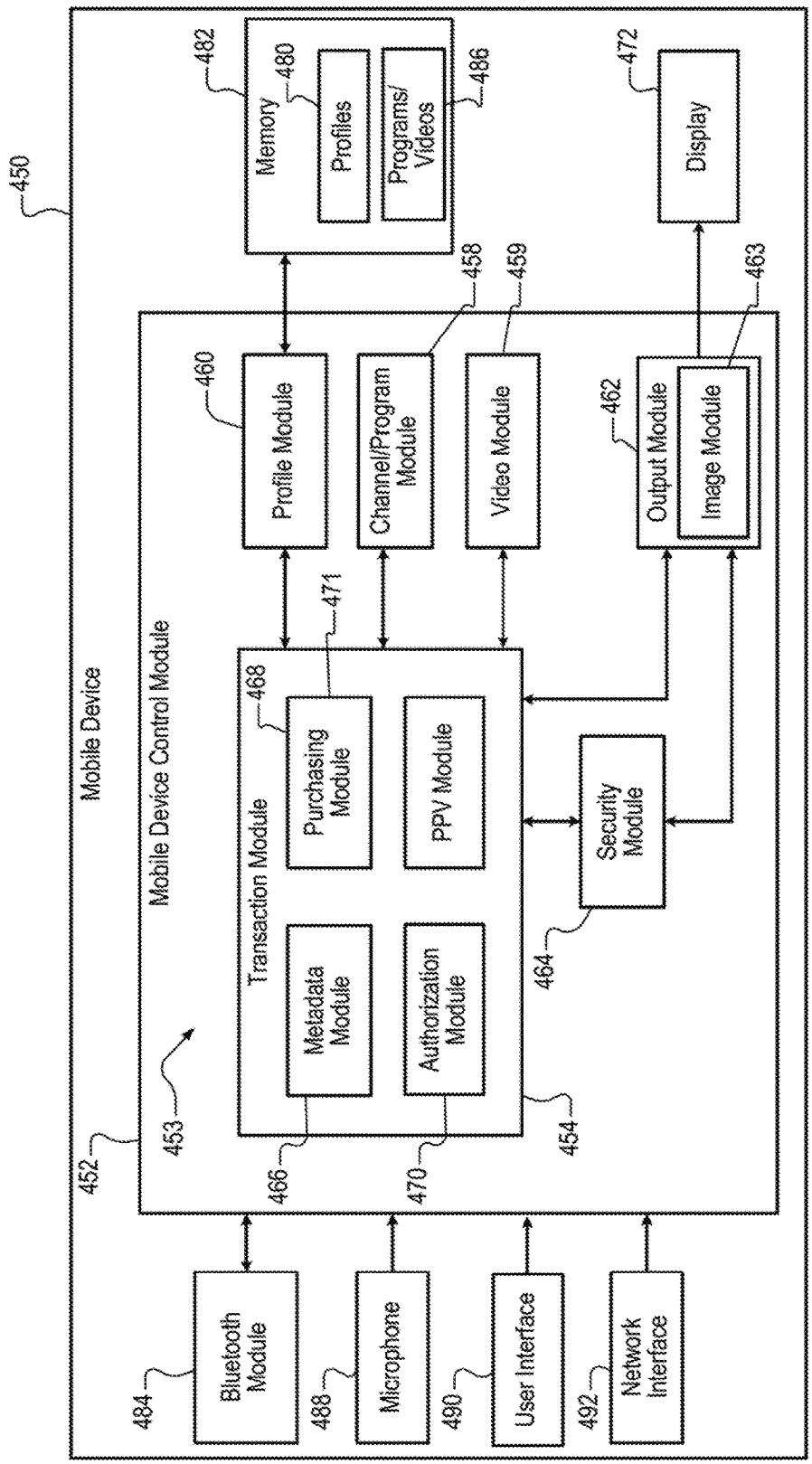
FIG. 5 is a functional block diagram of a mobile device in accordance with the present disclosure.

The mobile devices 31 may also have displays, an example of which is shown in FIG. 5. The displays of the mobile devices 31 may display video and output audio signals. The displays may be touch screens that act as user interfaces. Other types of user interfaces on the mobile devices 31 may include buttons and switches.

The network 42 may, for example, be a public switched telephone network, the Internet, a mobile telephone network or other type of network. The network 42 may be in direct wireless communication with the mobile device 31 via a cellular system and/or may be in indirect communication with the mobile devices 31 via the router 44 and/or the user receiving devices 30.

The content provider 14 provides content to the headend 12. Although only one content provider 14 is illustrated, more than one content provider may be incorporated in the system 10. The headend 12 distributes the content through the satellite 22 and/or the network 42 to the user receiving devices 30 and/or the mobile device 31. The content provider 14 may include and/or be implemented as content provider server 49.

A data provider 50 may also provide data to the headend 12. The data provider 50 may provide various types of data such as schedule data or metadata that is provided within the program guide system. The metadata may include various descriptions, actor, director, star ratings, titles, user ratings, television or motion picture parental guidance ratings, descriptions, related descriptions and various other types of data. The data provider 50 may provide the data directly to the headend and may also provide data to various devices such as the mobile device 31 and the user receiving device 30 through the network 42. This may be performed in a direct manner through the network 42. The data provider 50 may include and/or be implemented as a data provider server 52.

The communication system 10 may further include a product and/or service provider 54, a payment service provider 56, an advertiser 58. The product and/or service provider 54, the payment service provider 56 and/or the advertiser 58 may respectively include and/or be implemented as a product and/or service provider server 60, a payment server 62 and/or an advertiser server 64. The product and/or service provider server 60 may offer for sale products (e.g., non-content products, consumer products) and/or offer services (e.g., residential and/or business services, legal services, medical services, etc.) to users of the user receiving devices 30 and/or mobile devices 31. The payment server 62 may interact with the user receiving devices 30 and/or the mobile devices 31 to facilitate presenting offers, receiving acceptance of the offers and confirmation of the acceptance. The advertiser server 64 may include an advertiser database 65 and may present offers for products and/or services to the user receiving devices 30 and the mobile devices 31. The servers 49, 52, 60, 62 and 64 may communicate with the user receiving devices 30 and mobile devices via the network 42 and/or router 44.

The communication system 10 may also include a cloud network 66 (referred to as "the cloud"). The cloud network may include a cloud server 68. The cloud server 68 may store various types of information and/or data which may be accessible by the headend 12, the servers 49, 52, 60, 62, 64, the user receiving devices 30 and the mobile devices 31. The various types of information and data may include, for example, user information, billing information, offers, ads including upsell and/or cross-sell ads, object (product and/or service) information, etc.

Figure 2:
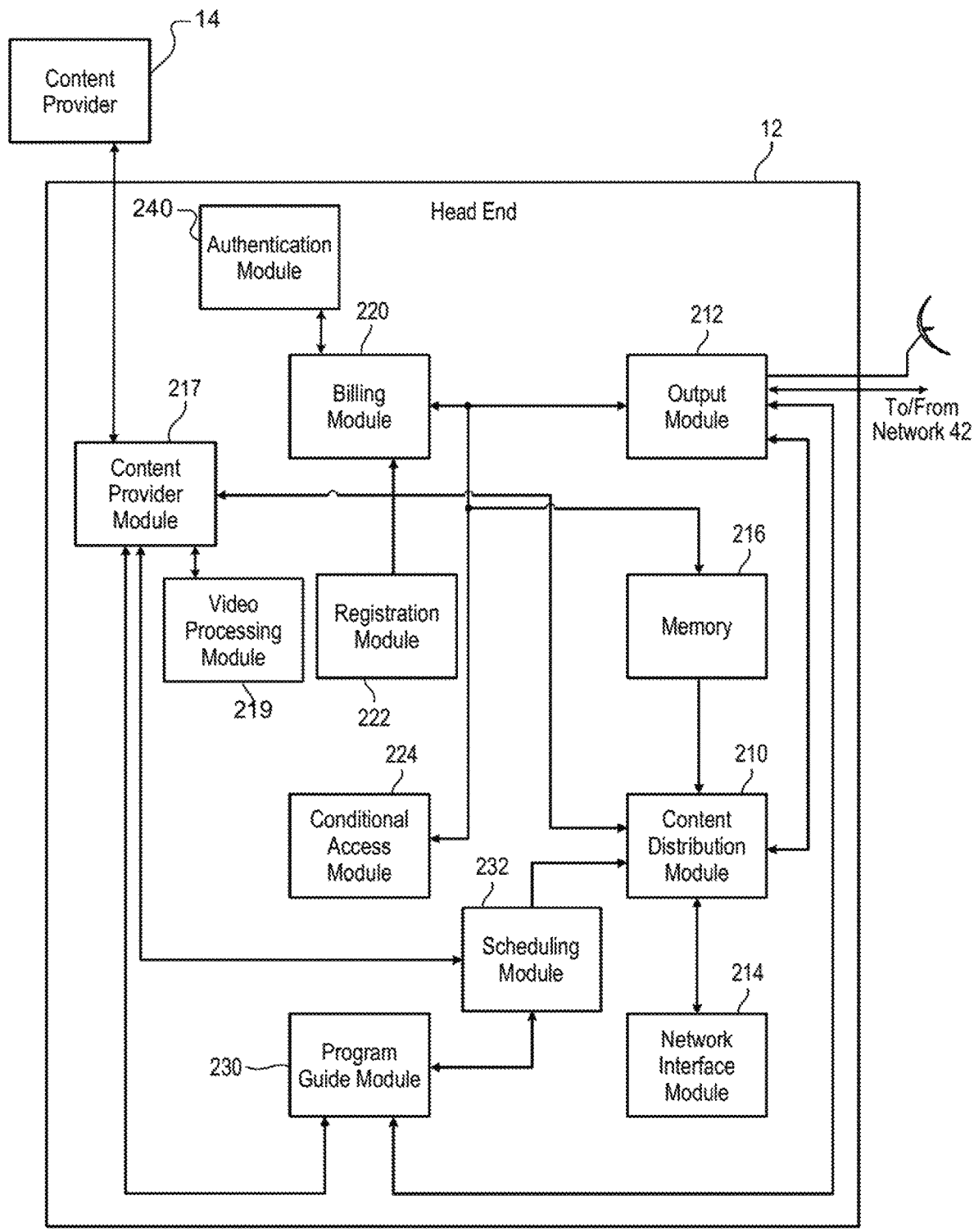
FIG. 2 is a functional block diagram of a headend in accordance with the present disclosure.

FIG. 2 shows the headend 12. It should be noted that the headend 12 is illustrated as a single device or facility, but may refer to multiple devices and/or facilities. That is, each of the individual components illustrated within the headend 12 may be physically located in various locations. The headend 12, one or more of the modules of the headend 12, and/or the memory of the headend 12 may be included in the content provider 14.

The headend 12 may include a content distribution module 210 that is used for distributing content through different means. The headend 12 may be in communication with an output module 212 for uplinking content to a satellite through the satellite antenna 18 as illustrated in FIG. 1 and/or transmitting signals to and/or receiving signals from the network 42. The output module may include and/or be implemented as an interface and/or a transceiver. The content distribution module 210 may thus format the signal in an appropriate format for uplinking through the output module 212. The output module 212 may uplink various content through the satellite to the user receiving devices 30 and/or the mobile devices 31 (collectively referred to as receiving devices) of FIG. 1. The content distribution module 210 may also transcode the content in formats suitable for use by the receiving devices.

The output module 212 may also communicate conditional access data to the receiving devices for accessing the content. The conditional access data may be communicated in a conditional access packet that includes data for tuning the receiving devices to receive the data. The conditional access data may be received directly or indirectly from a conditional access module 224. The conditional access module 224 may provide conditional access signals to a billing module 220 to allow a particular user access to content. The conditional access module 224 may generate a conditional access packet (CAP) together with data from the billing module 220 for uplinking through the output module 212. If the content is satellite content, access data such as, but not limited to, the particular transponder, channel and time at which the content is broadcasted may be provided in the CAP. If the content is to be provided over an Internet or other broadband-type network, an IP address of the content may be provided. The CAP may also include encryption/decryption information for the receiving devices to receive the content and decode the content.

The content distribution module 210 may also be in communication with a network interface module 214. The network interface module 214 may be in communication with the network 42 (shown in FIG. 1) for communicating content therethrough. The network interface module 214 (or the content distribution module 210) may format the content signals into internet protocol signals for distribution through the network 42.

The content distribution module 210 may also be in communication with content memory 216. The content memory 216 may be referred to as a content repository. The content memory 216 may receive content from a content providing module 217 for distribution through the satellite system or the network 42. The content providing module 217 may receive content from the content provider 14. The content memory 216 may save on-demand or PPV content therein.

The content providing module 217 may also provide live television content for distribution through the content distribution module 210. The content distribution module 210 may thus communicate live content through the output module 212 or through the network interface module 214 to the appropriate networks. The content providing module 217 may provide content and/or ads to a video processing module 219, which may perform image recognition to detect products and generate corresponding metadata. This is described in further detail below.

The content providing module 217 processes received content for communication through the satellite 22 or network 42. The content providing module 217 may communicate live content as well as recorded content. The content memory 216 may store on-demand or PPV content for distribution at various times. The PPV content may be broadcasted in a linear fashion (at a predetermined time according to a predetermined schedule). Linear content may be presently broadcasted and may also be scheduled to be broadcasted in the future. The content memory 216 may also store on-demand content therein. On-demand content is content that is broadcasted at the request of a user receiving device and may occur at any time (not on a predetermined schedule). On-demand content is referred to as non-linear content.

A billing module 220 may also be incorporated into the headend 12. The billing module 220 may be used for associating one or more receiving devices with a user account. For example, different types of receiving devices such as mobile devices and one or more fixed set top boxes may be associated with a user account. By associating the receiving devices with a user account, content may be shared or accessed by each of the receiving devices associated with the account.

A registration module 222 may be used to associate each of the receiving devices with a user account at the billing module 220. The registration module 222 may be an automated system through which the user calls or accesses remotely by computer for associating the receiving devices with the account. The registration module 222 may also be partially human activated in which a customer service representative enters data for multiple receiving devices and associates the receiving devices with an account.

A program guide module 230 may also be included within the headend 12. The program guide module 230 receives metadata and other data from the content providing module 217. The program guide module 230 is ultimately used to communicate content and metadata to the output module 212. The program guide module may thus contain data related to the ratings of the particular content to be broadcasted and controlled by the content distribution module 210.

The program guide module 230 communicates program guide data to the user receiving devices 30 illustrated in FIG. 1. The program guide module 230 may create various objects with various types of data. The program guide module 230 may, for example, include schedule data, various types of descriptions for the content and content identifier that uniquely identifies each content item. The program guide module 230, in a typical system, communicates up to two weeks of advanced guide data for linear content to the user receiving devices. The guide data includes tuning data such as time of broadcast data, end time data, channel data, and transponder data to name a few. Guide data may also include content available on-demand and pay-per-view content.

A scheduling module 232 may be in communication with the program guide module 230 and the content distribution module 210 to arrange the content to be distributed as well as provide program guide data for the content to be distributed. The scheduling module 232 may also be in communication with the content providing module 217 for obtaining a schedule for live channel broadcast.

An authentication module 240 may be used to authenticate various user receiving devices and mobile devices that communicate with the headend 12. The authentication module 240 may be in communication with a billing module 220. The billing module 220 may provide data for subscriptions and various authorizations suitable for the user receiving devices and the mobile devices. The authentication module 240 ultimately permits the user receiving devices and mobile devices to communicate with the headend 12. Authentication may be performed by providing a user identifier, a password, a user device identifier or combinations thereof. Channels and/or programs may be provided to the user receiving devices and/or mobile devices based on passcodes, as further described below.

Figure 3:
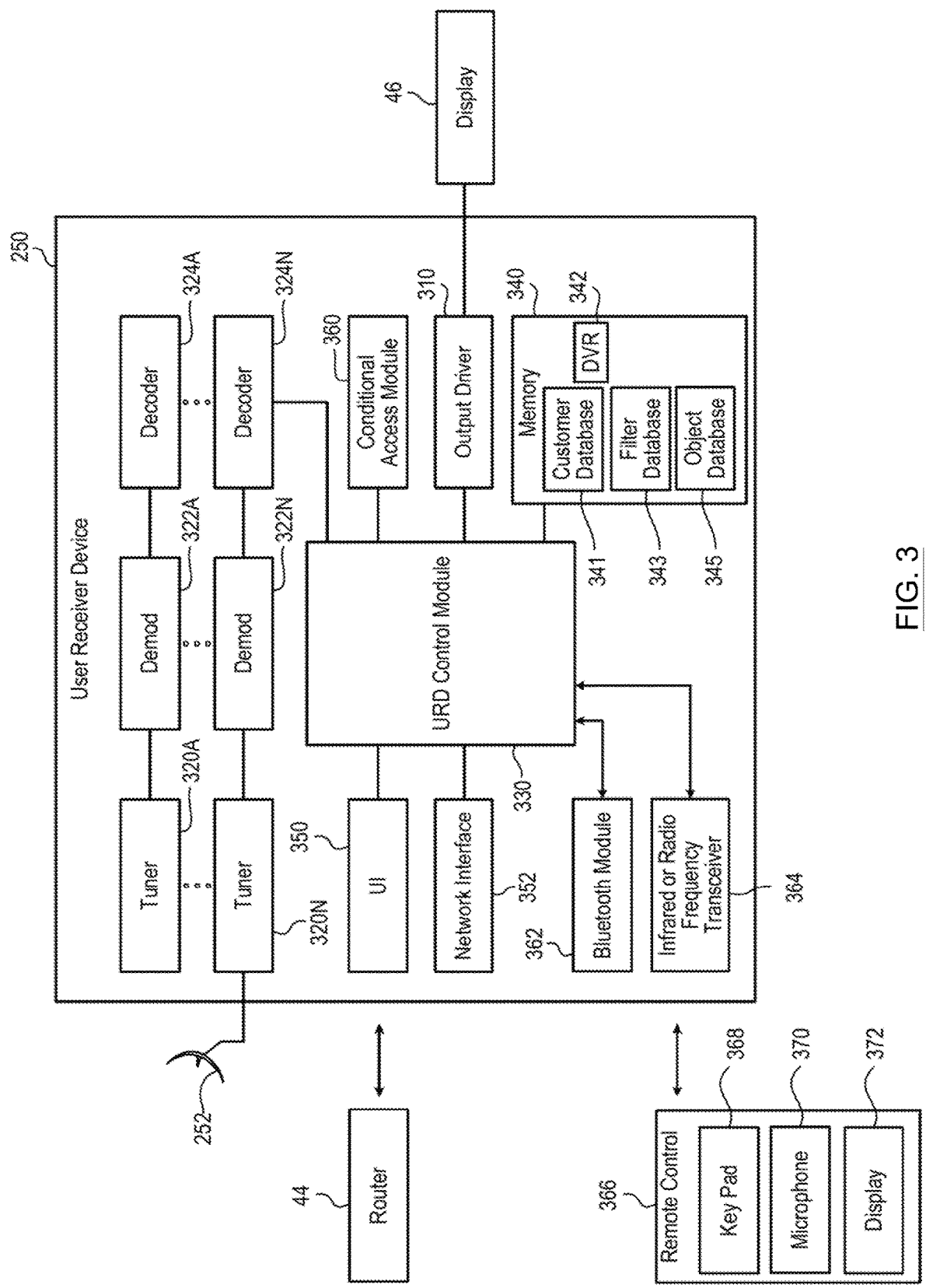
FIG. 3 is a functional block diagram of a user receiving device in accordance with the present disclosure.

FIG. 3 shows a user receiving device 250 that may replace any of the user receiving devices 30 of FIG. 1. Although, a particular example using the user receiving device 250 as a satellite set top box is illustrated, it is merely representative of various electronic devices with an internal control module (or controller) used as a content receiving device. An antenna 252 may be one of a number of different types of antennas used for receiving satellite signals that may include one or more low noise blocks associated therewith. The antenna 252 may be a single antenna used for satellite television reception. Of course, multiple antennas for receiving signals from satellites in different orbital slots may be used. In a terrestrial system such as a cable television system, no antenna may be used. Rather, a connector to a fiber optic or coaxial cable may be used. Terrestrial systems may have an antenna suitable for receiving terrestrial wireless signals. The user receiving device 250 is connected to a display (e.g., one of the displays 46). The user receiving device 250 may have an output driver 310 for formatting video and audio signals for output to the display 46.

A user receiving device control module 330 may be used to coordinate and control the various functions of the user receiving device 250. The user receiving device control module 330 may include and/or be implemented as a controller. These functions may include functions of: tuners 320A-320N (collectively 320); demodulators 322A-322N (collectively 322); decoders 324A-324N (collectively 324) such as forward error correction decoders; and any corresponding buffers and/or other related functions.

The tuners 320 receive respective signals or data from corresponding individual channels. The tuners 320 may receive data from a satellite or a source such as cable or over-the-air TV broadcasts. The tuners 320 may receive television programming content, program guide data or other types of data. The demodulators 322 demodulate the signals or data to form a demodulated signal or data. The decoders 324 decode the demodulated signals to form decoded data or decoded signals. By providing a number of tuners, demodulators and decoders, a number of different content programs may be used by the user receiving device 250. For example, live viewing and recording may be performed simultaneously. A number of recordings may be made simultaneously depending on the number of tuners available.

The user receiving device control module 330 is in communication with a memory 340. The memory 340 is illustrated as a single box. The memory 340 may be implemented as multiple different types of memories including a hard drive, a flash drive and various other types of memory devices. The memory 340 may be other types of memory or sections of different types of memory. The memory 340 may be non-volatile memory or volatile memory. The memory 340 may include a customer database 341 and a DVR 342. The DVR 342 may include recorded content stored for later playback.

The memory 340 may include storage for various operational data collected during operation of the user receiving device 250. For example, the memory 340 may store user configuration data for each user associated with a device or system. The user configuration data may include rating limits set by a user of the user receiving device 250. A default user configuration may also be established in case visual recognition is not achieved. This will be described in detail below. Other types of data in the memory 340 may include the channel subscription data, the blocked channels, adult channels, current set top box language, TV resolution data, to do list data, the conditional access module identifier, time zone data, time of day daylight savings, status data, aspect ratio data, viewing hours data, quick tune list and a zip code.

The memory 340 may also store the advanced program guide data. The memory 340 may store program guide data that is received from the headend. The program guide data may include amounts of data including two or more weeks of program guide data. The program guide data may be communicated to the user receiving device 250 in various manners including through the satellite 22 of FIG. 1. The program guide data may include content or program identifiers, ratings and various data objects corresponding thereto.

The user receiving device 250 may also include a user interface (UI) 350. The UI 350 may include various types of user interfaces such as a keyboard, push buttons, a touch screen, and a voice activated interface or the like. The UI 350 may be used to: select a channel; change user profiles including acceptable ratings; select various information such as content selections; change the volume; change the display appearance; and/or perform other functions. The UI 350 may also be used for selecting playback locations of the content.

A network interface 352 may be included within the user receiving device 250 to communicate various data through the networks 36, 42 described above. In one implementation, the user receiving device 250 does not include the network interface 352. The network interface 352 may be a WiFi, WiMax, WiMax mobile, wireless, cellular, or other types of communication systems. The network interface 352 may use various protocols for communication therethrough including, but not limited to, hypertext transfer protocol (HTTP).

The user receiving device 250 may also include a conditional access module 360. The conditional access module 360 prevents unauthorized reception of the television signals through the antenna 252. The conditional access module 360 may use a cryptographic hash to authorize the use and display of the received signals. The conditional access module 360 may receive the proper codes or signals from the headend.

The user receiving device control module 330 may also be connected to a Bluetooth module 362 (is Bluetooth® enabled). The Bluetooth module 362 may include and/or be implemented as a Bluetooth transceiver. The Bluetooth transceiver may be in communication with mobile devices (e.g., the mobile devices 31 of FIG. 1). The user receiving device control module 330 may communicate with the mobile devices 31 via the router 44 and/or the Bluetooth transceiver. The transceivers disclosed herein may include and/or be implemented as transceivers.

The user receiving device control module 330 may also include an infrared or radio frequency transceiver 364 for communication with a remote control device 366. The remote control device 366 may be used to, for example, change a channel of the user receiving device 250. The remote control device 366 may also be used to, for example, resume viewing of a channel and/or a video, as is further described below. The remote control device 366 may include a keypad 368 for generating key signals that are communicated to the user receiving device 250. The remote control device 366 may also include a microphone 370 for receiving an audible signal and converting the audible signal to an electrical signal. The electrical signal may be communicated to the user receiving device 250. The remote control device 366 may also include a display 372.

Figure 4:
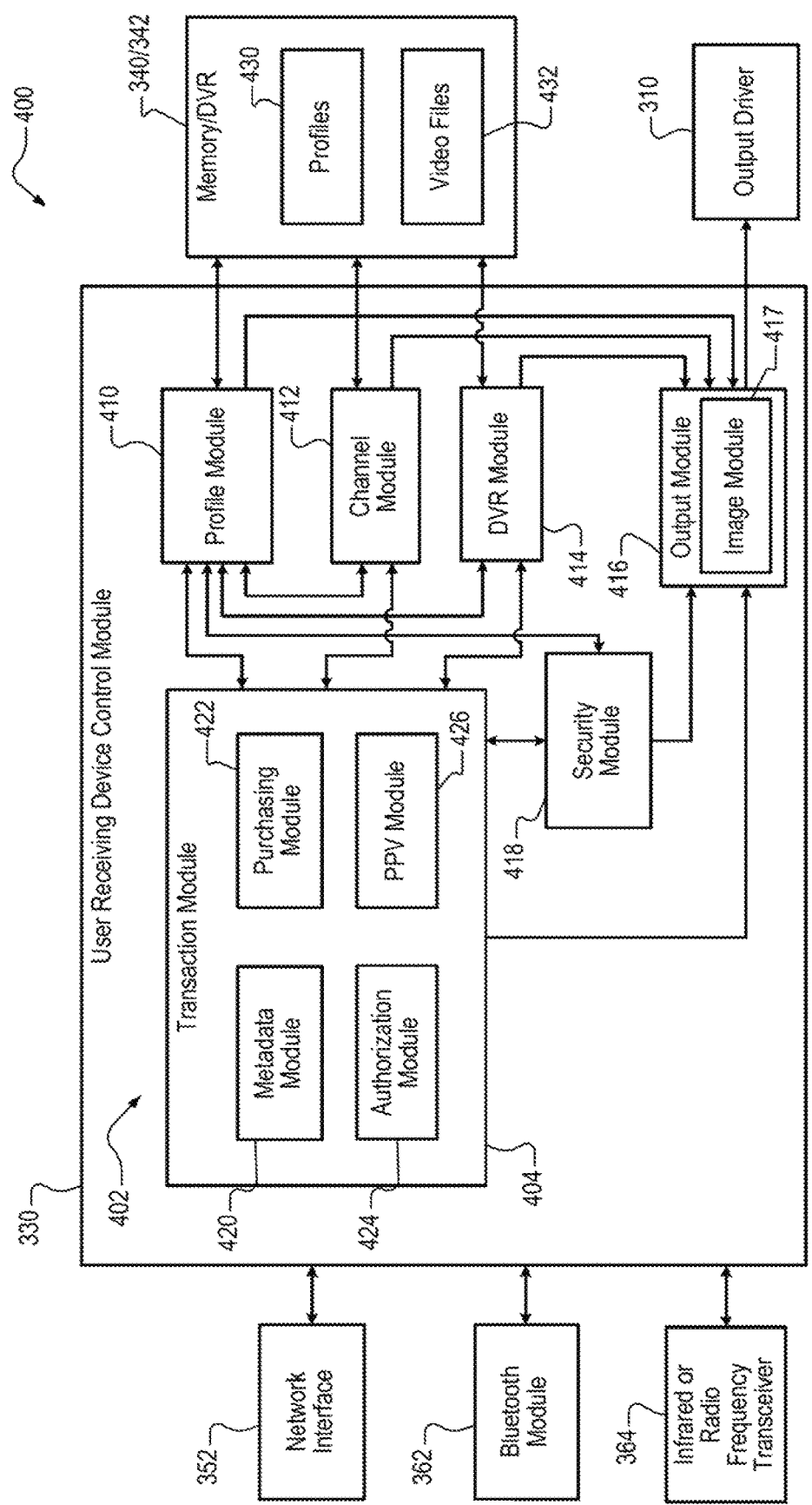
FIG. 4 is a functional block diagram of a control module of the user receiving device of FIG. 3.

FIG. 4 shows a portion 400 of a user receiving device (e.g., one of the user receiving devices 30, 250 disclosed above). The portion 400 includes the output driver 310, the user receiving device control module 330, the network interface 352, the Bluetooth module 362, and the transceiver 364. The portion 400 also includes the memory 340 and the DVR 342, which are shown collectively as memory/DVR 340/342. The user receiving device control module 330 includes a transaction system 402. The transaction system 402 includes a transaction module 404, a profile module 410, a channel module 412, a DVR module 414, an output module 416 and a security module 418.

The transaction module 404 includes a metadata module 420, a purchasing module 422, an authorization module 424, and a pay-per-view (PPV) module 426. The metadata module 420 monitors metadata to detect purchasable objects in a video. The purchasing module 422 may control purchasing of content by a user of a mobile device. This may include receiving and/or exchanging identification information, billing information, and/or contact information with a mobile device of a user and/or a content provider. The stated information may be received from the mobile device and transferred to the content provider or may be provided by the content provider. The stated information may be stored in the memory 340 and accessed by any of the modules 420, 422, 424, 426. The purchasing module 422 may provide confirmation request messages, which may be displayed to confirm that the user wants to purchase certain selected content. The confirmation request messages may have originated at and/or have been received from the content provider.

The authorization module 424 may perform one or more handshake processes with the headend, the content provider, and/or a mobile device to authorize (or reauthorize) reception and/or display of content on a display of the corresponding user receiving device and/or the mobile device. The content may be PPV content or other content. In one embodiment, the authorization module 424 receives authorization signals from a content provider to permit downloading and/or displaying of certain content.

The authorization module 424 may generate authorization preview screens and/or authorization messages. The authorization module 424 may display via the output module 416 the authorization preview screens and the authorization messages. The authorization preview screen may be a blank (or black) screen or may provide, for example, an image of a scene of the content attempting to be accessed by a user. The authorization preview screen may include an authorization message and/or a code.

The pay-per-view (PPV) module 426 may generate PPV preview screens and/or PPV messages. The PPV module 426 may display via the output module 416 the PPV preview screens and the PPV messages. The PPV preview screen may be a blank (or black) screen or may provide, for example, an image of a scene of the content attempting to be accessed by a user. The PPV preview screen may include a PPV message.

The profile module 410 manages profiles 430 of each of the mobile devices paired with the corresponding user receiving device. The profiles 430 may be stored in the memory 340 and accessed by the profile module 410. Each of the profiles 430 may have a unique identifier (ID) number, an assigned security level, and corresponding authorized channels, programs and/or videos. The security level may indicate which channels, programs, and/or videos are permitted to be displayed for the corresponding profile. Different profiles may have the same security level or different security levels. One or more mobile devices may be assigned to a profile and thus have a corresponding profile ID number. Each of the profiles may also include mobile device and/or profile specific features such as volume levels, maximum volumes, amount of time permitted ON over a predetermined period, a playlist of recorded videos, a preferred channel list, and other features. The profile module 410 may create each of the profiles 430 based on: parental control inputs; operation history of the corresponding mobile devices; time of day of watching a channel, program and/or video; and/or profile information provided by the corresponding mobile devices.

The channel module 412 may control selection and output of channels to the output driver 310 via the output module 416. The DVR module 414 may control selection, recording, and/or output of videos. The DVR module 414 may store videos in the DVR 342 and output the videos via the output module 416 to the output driver 310 for display. The channel module 412 and the DVR module 414 may operate based on parental guidance controls. The channel module 412 and the DVR module 414 may provide channels and/or videos to the output module based on the profile ID number and/or the security level associated with a profile of one or more mobile devices. The videos may be stored as video files 432 in the memory 340 and/or DVR 342.

The output module 416 controls output of channels, programs, and/or videos to the output driver 310. This may be based on parental guidance controls. The output module 416 may output channels and/or videos to the output driver 310 based on the profile ID number and/or the security level associated with a profile of one or more mobile devices. The output module 416 includes an image module 417 that may alter a portion of an image of an object to alert a viewer of the object.

The security module 418 may control operation of the output module 416 based on a security level of a profile. The security module 418 may also be used to set passcodes and/or require a passcode to view certain channels, programs and/or videos. The security module 418 may be in communication with the mobile devices via the Bluetooth module 362.

FIG. 5 shows a mobile device 450. Any of the mobile devices of FIG. 1 may be configured as the mobile device 450. The mobile device 450 includes a mobile device control module 452 that controls various functions of the mobile device 450. The mobile device control module 452 includes a second transaction system 453 that includes a transaction module 454, a channel module 458, a video module 459, a profile module 460, an output module 462 and a security module 464. The transaction module 454 includes a metadata module 466, a second purchasing module 468, a second authorization module 470, and a second pay-per-view (PPV) module 471. The metadata module 466 monitors metadata to detect purchasable objects in a video.

The purchasing module 468 may control purchasing of content by a user of a mobile device. This may include receiving and/or exchanging identification information, billing information, and/or contact information with a user receiving device and/or a content provider. The stated information may be stored in the memory 340 and accessed by any of the modules 466, 468, 470 and 471. The purchasing module 468 may provide confirmation request messages, which may be displayed on the mobile device to confirm that the user wants to purchase certain selected content. The confirmation messages may have originated at and/or have been received from the user receiving device and/or the content provider.

The authorization module 470 may perform a handshake process with the headend and/or the content provider disclosed above to authorize (or reauthorize) reception and/or display of content on a display of a user receiving device and/or the mobile device. An authorization signal for selected content may be received from a headend or content provider and forwarded from the mobile device to the user receiving device. The authorization signal permits downloading and/or displaying of certain content.

The PPV module 471 may control PPV purchase requests. The PPV module 471 may generate request signals for PPV content. The PPV request signals may include channel, program and/or video identification information. This information may be provided to a headend, content service provider and/or user receiving device. The PPV module 471 may receive PPV content from the headend, the content provider and/or the user receiving device and forward the content to the channel module, the video module, and/or the memory 482. The PPV module 471 may display the content via the output module 462 on the display 472.

The profile module 460 manages profiles of the mobile device 450 and/or other mobile devices. The profiles 480 may be stored in memory 482 and accessed by the profile module 460. The profiles 480 may have respectively a unique ID, an assigned security level, and corresponding authorized channels, programs and/or videos. The profile ID may be assigned by a user receiving device. The security level may be assigned by another mobile device (e.g., parental device) and/or a user receiving device. The security level may indicate which channels, programs, and/or videos are permitted to be displayed for the corresponding profile. Each of the profiles may also include mobile device and/or profile specific features such as volume levels, maximum volumes, time permitted ON over a predetermined period, a playlist of recorded videos, a preferred channel list, and other features. The profile module 460 may create the profiles 480 based on parental control inputs, operation history of the corresponding mobile devices, and/or profile information provided by the corresponding mobile devices. As an alternative the profile module 460 may receive one or more of the profiles 480 from a user receiving device. The profile module 460 may store user profile data within the mobile device 450. The profile module 460 may store user settings, such as favorites and parental controls. The profile module 460 may also receive profile data from the headend 12.

The output module 462 controls output of signals, guides, channels, programs, and/or videos to the display 472. Although not shown, the mobile device control module 452 may include guide, channel, program, and/or video modules for the accessing and/or displaying respectively of guides, channels, programs, and/or videos. The output module 462 may output signals, guides, channels, programs, and/or videos to the display 472 based on the profile ID and/or the security level associated with the profile 480. The output module 462 includes an image module 463 that may alter a portion of an image of an object to alert a viewer of the object.

The security module 464 may control operation of the output module 462 based on a security level of the profile 480. The security module 464 may also be used to set passcodes and/or require a passcode to view certain channels, programs and/or videos. The security module 464 may be in communication with user receiving devices via a Bluetooth module 484 and/or other interface and/or transceiver.

In one implementation the mobile device 450 may be used as a remote control device and send signals to a user receiving device to select a channel, program and/or video. In another embodiment, the security module 464 provides a passcode, which may be entered by a user of the mobile device 450. Content received by the mobile device control module 452 may be stored in the memory. This may include programs and/or videos 486.

The mobile device control module 452 is in communication with a microphone 488 that receives audible signals and converts the audible signals into electrical signals. The audible signals may include a request signal. The request signal may be to perform a search and/or to obtain guide data, network data and/or playlist data. The mobile device control module 452 is also in communication with a user interface 490. The user interface 490 may include buttons, input switches and/or a touch screen.

The mobile device control module 452 is also in communication with a network interface 492. The network interface 492 may be used to interface with the network 42 of FIG. 1. As mentioned above, the network 42 may be a wireless network or the Internet. The network interface 492 may communicate with a cellular system or with the internet or both. A network identifier may be attached to or associated with each communication from the mobile device 450.

Various examples are disclosed below with respect to the embodiments of FIGS. 6-9 and other embodiments of the present disclosure. Although one or more of the embodiments are primarily described with respect to a content provider, all of the tasks performed by the content provider may be performed by a headend, a content service provider, a network, and/or an intermediary device in communication with a corresponding mobile device, headend, and/or the content provider.

For the embodiments of FIGS. 6-14 and other embodiments disclosed herein, the mobile devices and/or POP devices may include software applications (referred to as "apps") with corresponding screens (or windows). The apps may be executed via one or more modules (e.g., control modules) of the mobile devices and/or POP devices and may allow a user to send various types of information disclosed herein to a user receiving device and/or a content provider. The apps and corresponding screens may allow the user to perform various tasks such as confirming a purchase, send billing information, send contact information, answer questions in a survey, select a product, etc. As used herein, the terms "user" may refer to an individual associated with an account provided by a content provider (e.g., a customer) or other user.

Figure 6:
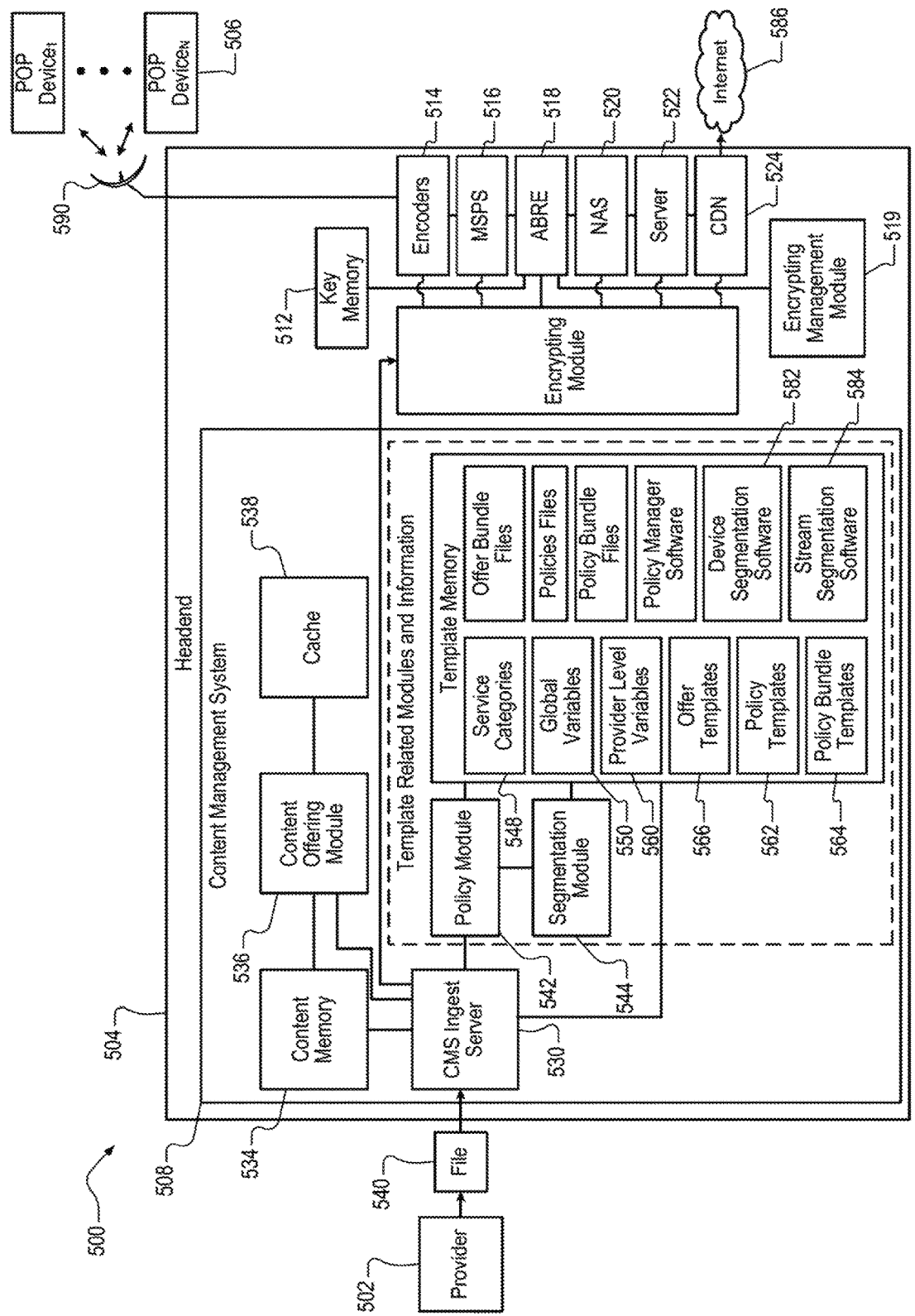
FIG. 6 is a functional block diagram of a policy management system in accordance with the present disclosure.
Figure 7:
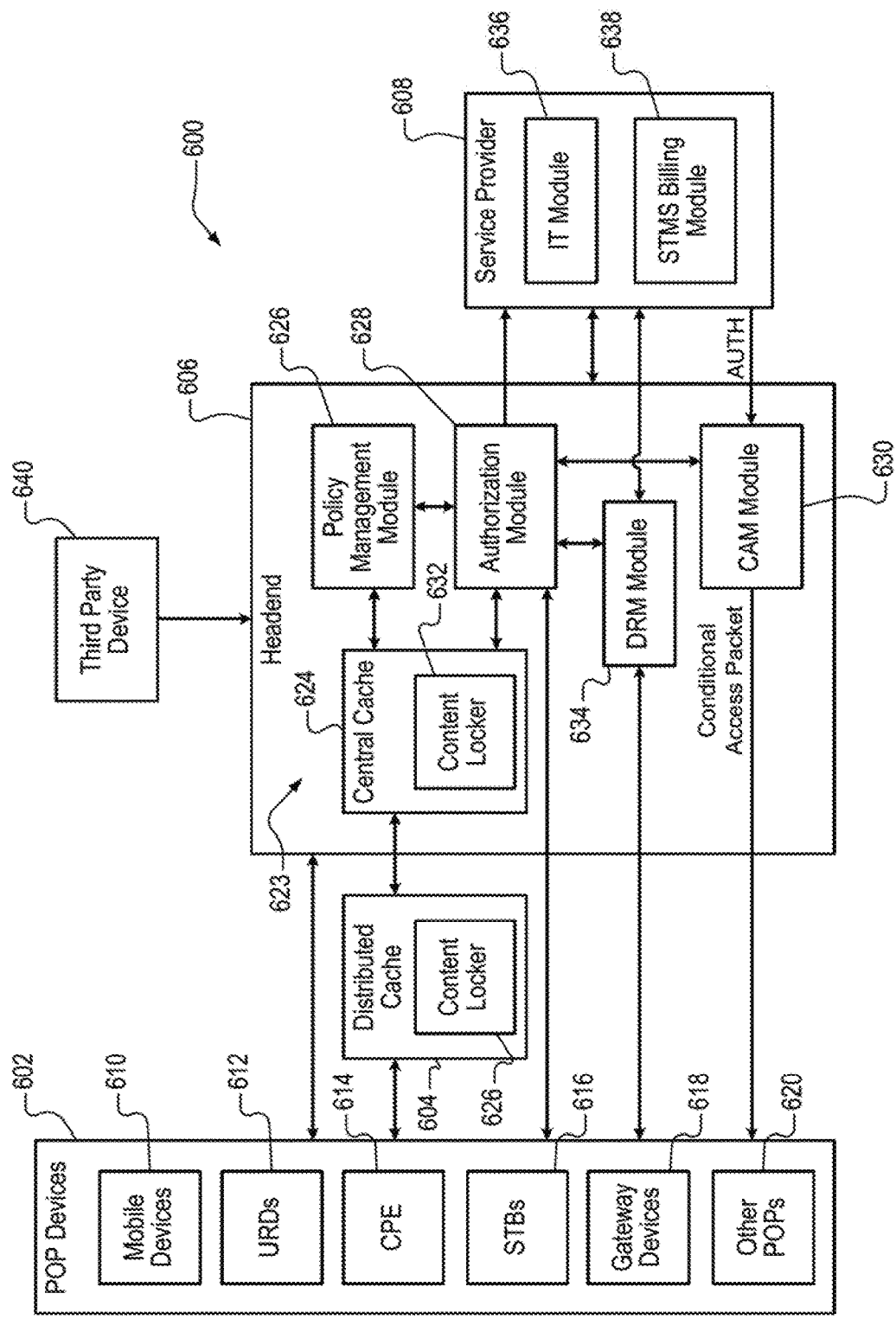
FIG. 7 is a functional block diagram of a portion of the policy management system of FIG. 6.

FIG. 6 shows a policy management system 500 that includes a service provider 502, one or more headends (a single headend 504 is shown) and POP devices 506. Each of the headends is a large data center that is located at a central location and includes multiple systems. Each of the headends may replace the headend 12 of FIG. 1 and/or be configured as shown in FIG. 2. As an example, each of the systems may be implemented as one or more servers. The servers may have the same information and/or may share any of the information stored at any one or more of the servers. Entitlement and usage policies (referred to herein as "policies") are created, edited, and injected into workflow at the headend such that rules and/or commissions in a policy are imported into different systems within the headend as part of the workflow and used by an authorization systems or modules (an example authorization module is shown in FIG. 7).

The headend 504 may include, depending on the number of systems, one or more of each of a content management system (CMS) 508, an encrypting module 510, a key memory 512, a set of encoders 514, multi-bit rate streaming processor server (MSPS) 516, an adaptive bit rate encryptor (ABRE) 518, encrypting management module 519, a network attached storage device 520, a server 522, and a content delivery network (CDN) 524. The CMS 508 includes a CMS ingest server 530, template related modules and information 532, a content memory 534, a content offering module 536 and cache 538. The provider 502 provides requested content in the form of one or more files and/or packets (e.g., files 540) to the CMS ingest server 530, which then stores the requested content in the content memory 534. The files may be mezzanine (or source) files and/or compressed files, such as .zip files. The template related modules and information 532 provide policies (or rules) for offering and distributing the stored content to the POP devices 506. The POP devices 506 may be configured as the URD of FIG. 3 and/or the mobile device of FIG. 5.

An offer is a collection of (i) usage polices, (ii) content licensing restrictions, (iii) device restrictions, and (iv) content identifiers. An offer includes an offer ID, a program ID or tribune media services (TMS) ID, policy bundle, price code, available timing window, rental timing window, download timing window, etc. An offer refers to a method of merchandising programming content individually or in packages and is associated to a policy instance of a policy template. The policy template encapsulates entitlement attributes in the form of a structured list of key/value pairs. A key is universally unique and maintained in a key dictionary as a central repository of named attributes. The central repository may be a portion of the central cache 624 or portion of other memory in the headend 606. Offers provided to customers may be stored in the lockers of the customer, such as in the lockers 622, 632. The lockers may store digital content and/or offers. The policy templates, policy instances and corresponding attribute keys are created and maintained by the content policy services system 623.

The template and related modules and information 532 include a policy module 542, a segmentation module 544 and a template memory 546. The template memory may store service categories 548, global variables 550, provider level variables 560, policy templates 562, policy bundle templates 564, offer templates 566, offer bundle templates 572, policy management software 580, device segmentation software 582, and stream segmentation software 584. A template is a representation and/or composition of a policy. A policy is a set of rules, which are implemented to control the usage and enforcement of a type of content based on multiple conditions. A policy template includes one or more polices, equations, and/or software to be used when implementing the rules and/or conditions of the policies. The conditions allow a particular content to be displayed on and/or via a particular POP device during a predetermined period of time. As an example, a condition may be that a customer is required to have a particular type and/or version of a POP device. As another example, a condition may be that a customer must be at least a certain age and/or view the requested content during a certain timer period. Numerous different conditions may be included in the policy templates. Policies relate different types of devices to different types of content.

A policy template provides the flexibility and extendibility to define rules and provision entitlement offers based on multi-level attributes such as viewing time, geographical location, proximity (in-home or out-of-home), device profiles, content providers, advertisers, user profiles, blackout periods, concurrent streaming limits, delivery methods, etc. The provisioning and publishing of conditional entitlement with attributes such as viewing window, pricing, format, streamable (i.e. whether the content is streamable), etc. is implemented by multiple systems of the headend 504. This allows a service provider to quickly adapt to ever changing rules and afford a diverse portfolio of content offers with minimal impact to system design and implementation. The implementation of policy templates as disclosed herein allow for: a same asset (or content) used for pay-to-own (electronic sell through) and pay-to-rent VOD content (4K, HD and/or SD format), where a policy template can be defined for this asset that can be instantiated for EST and VOD offers with different policy attributes; common authorization of entitlement across multiple playback POP devices, which may include permanent access rights (PAR) authorized for EST and/or abiding with offer policy management of content (e.g. device type restrictions); changes to or newly introduced rules for a service category; changes to an offer to be propagated via policy template to systems that are part of a service provider infrastructure of ingestion; and provisioning and authorizing ecosystems, where at each gate of a pipeline a system is consuming (importing/processing) policy attributes that are relevant to the system and ignoring others. Enforcement of a policy template on an offer is enabled by a central repository (e.g., the template memory 546) of policy instances associated to offers. Examples of service categories are: 48-hour or 72-hour streaming VOD (rental); electronic sell through (permanent access rights)—movies and episodic shows/series; and 4K on STB and HD/SD on mobile (second screen) devices.

The segmentation software 582, 584 may be executed via the segmentation module 544 and control policies for each of the POP devices 506. In addition or as an alternative, the segmentation software 582 may be executed by the content offering module 536. The content offering module may be implemented as a system having one or more modules. The device executing the segmentation software 582 classifies different POP devices based on characteristics of the devices. The characteristics include device type (e.g., personal computer, laptop, tablet, mobile telephone, television, URD, etc.). The characteristics may also indicate a content offering system (COS) version, such as whether the POP device is an IPhone® operating system (iOS®) device, an Android® operating system device, a Microsoft® operating system device, or other operating system devices.

Device and stream segmentation refers to identifying, classifying and segmenting types of devices and types of streams of content. For example, if a customer wants to play a movie on an iOS® device and requests the movie using a VOD service, rules within the policies dictate how streams are segmented to provide the movie to the iOS® device having the same device type. Some content may not be permitted for viewing on certain types of devices and/or to certain customers and/or users. Stream segmentation may prevent the content from being provided to these types of devices. As another example, different devices may have different resolution displaying capabilities. Stream segmentation may provide the content to the POP devices based on resolution displaying capabilities of the POP devices. The content may be provided having different types of resolution at different bit transfer rates. The rules and/or conditions may be based on memory sizes, processing capabilities, and/or screen resolutions of the POP devices. The rules and/or conditions may be based on compression rates of the content such that when the content when viewed is not interrupted due to buffering and/or improper data transfer rates. Although bandwidth may change, the content is displayed without glitches and/or delays due to buffering. These various rules and/or conditions may be stored in the template memory 546 and accessed by the policy module 542 and/or the segmentation module 544. The resolution of the content being viewed may be adjusted based on the data transfer rates and/or bandwidth allocated to a POP device. For example, if the data transfer rate and/or bandwidth is high, then the resolution may be high. If the data transfer rate and/or bandwidth is low, then the resolution may be low. Thus, how content is fulfilled and delivered is based on the rules encapsulated in a policy.

The global variables 550 and the provider level variables 560 are configuration parameters. The global variables 550 may be used for any of the different POP devices and streams of content. The global variables 550 may include resolution, file size, title, content type, file attributes, etc. The provider level variables 560 may include names of providers, parameters associated with a particular provider, etc. The service categories may indicate VOD, EST, rental, purchase, etc.

The encoders 514 encode source content or content stored in the content memory 534 prior to being sent to the POP devices 506 via an antenna 590 or the Internet 586. The encoders 514 may digitize and compress mezzanine files and/or other files. The MSPS 516 breaks up the encoded content into segments (or predetermined amounts of content). The segments (or smaller files) are sent to the POP devices 506. The ABRE 518 adjusts a bit rate of the encoded segments and encrypts the encoded segments based on a key stored in the memory 512. The encrypting management module 519 controls the encrypting performed by the ABRE 518. The encrypted segments output from the ABRE 518 are stored in the network attached storage device 520 and/or server 522. The content delivery network 524 transmits the encrypted segments from the headend to the POP devices 506 via the Internet 586. The devices 513, 516, 518, 520, 522 and 524 may provide the processing to place content being delivered into a particular format for a particular type of POP device.

The content offering module 536 generates offers, which may be stored in the cache 538. The offers are generated based on original offers received from the provider, the offer templates 560 and/or offer bundle templates 572. The content offering module 536 may receive the original offers, offer templates 566, offer bundle templates 572 from the CMS ingest server 530 and/or may directly access the template memory 546. The templates 566, 572 are files including one or more offers and associated conditions of the offers. The offer bundle templates 572 include multiple offer templates. The offers may be directed to content stored in the content memory 534 and/or future content (e.g., content directed to a live event or video to be offered for sale) not yet delivered to the content memory 534.

FIG. 7 shows a portion 600 of the policy management system 500. The portion 600 includes POP devices 602, distributed cache 604, a headend 606, and a service provider 608. The POP devices 602, the headend 606 and/or the service provider 608 may be configured and/or operate as described above with respect to the POP devices, headends, and service providers associated with FIGS. 1-6. The POP devices 602 include mobile devices 610, URDs 612, customer premise equipment (CPE) 614, STBs 616, gateway devices 618, and/or other POP devices 620. The other POP devices 620 may be STBs that operate as gateways, routers, etc. The routers may include non-volatile memory including solid-state memory and/or hard disk drives. The distributed cache 604 includes a content locker 622. The headend 606 includes a content policy service system 623 that may include central cache 624, a policy management module 626, an authorization module 628, and a conditional access management module 630. The central cache 624 includes a content locker 632. The headend may also include a digital rights management (DRM) module 634. The service provider 608 includes an information technology (IT) module 636, and a subscriber transaction management system (STMS) billing module 638. Example service providers are DirectTV®, Netflix®, VooDoo®, etc. Each of the service providers may have respective rules for different types of content, POP devices, customers, etc.

The IT module 636 stores and/or accesses subscriber management, subscriber information, and billing information. The STMS billing module 638 tracks and records customer information including customer records, addresses, billing information, credit card numbers, identifiers of one or more packages the customer is subscribed to and/or has subscribed to, channels the subscriber is subscribed to and/or has subscribed to, etc.

The policy management system 500 and/or the portion 600 provides the system architecture for facilitating policy-based provisioning of entitlement and/or digital rights to POP devices for fulfilling digital asset requests. This may include providing content based on sets of rules provided in the policies. The provisioning performed by the policy management system 500 and/or the portion 600 involves, based on entitlement, the process of preparing and equipping a network to allow it to provide services to POP devices based on rules that exist at any moment in time. The rules are not fixed and may be changed at any moment in time. The term "entitlement" refers to information including usage rights and conditions, such as: permitted viewing periods; number of times content can be viewed; whether the content is owned or rented by a customer; what type of POP device can view and receive the content; what POP devices of a customer can the content be viewed; what customers and/or users can view the content; etc. The policy management system 500 and/or the portion 600 allow for provisioning of (i) complex multi-conditioned offers and policies, and (ii) enforcement of the policies for entitlement based distribution of content.

The distributed cache 604 may refer to cache located within the Internet and/or other network. Content provided to the POP devices 602 may be stored in the content locker 622 (or portion of the distributed cache 604). The central cache 624 may include one or more content lockers (the content locker 632 is shown). Each of the content lockers of the central cache 624 may store content for one or more customers, sets of customers, sets of POP devices, etc. The lockers 622, 632 may store content purchased by the customer of the POP devices 602 and/or content downloaded prior to purchase. Content may be downloaded, but may be inaccessible until purchased. This allows the content to be quickly viewed without waiting for the content to be downloaded. The lockers 622, 632 may be allocated to the user and/or one or more of the POP devices and may not be accessible to other users and/or POP devices.

The policy management module 626 implements the policies of the policy templates. The policy management module 626 may create the policy templates based on rules and/or conditions associated with content. The rules and conditions may be provided by the service provider 608 or a third party device 640. The rules and conditions for delivery fulfillment and display of content is captured and stored and referenced for enforcement. The enforcement may be implemented by the authorization module 628 and the CAM module 630. The policy management module 626, the authorization module 628 and the CAM module 630 specify, enforce and automatically provision rules and allow the rules to change, shrink, expand, and/or change at any moment in time. Different rules may be provided for different videos, for different service providers, different third party vendors, different POP devices, different geographical regions, different customers, different customer profiles, etc. For this reason, rules can have different dimensions. As another example, a rule may indicate that an asset (i.e. content) is provided under a license to a service provider and include the conditions under which the asset may be distributed from the service provider. The asset may refer to content provided on a certain channel. The conditions need to be met prior to the service provider selling the content to a particular customer. The content is delivered to POP devices of customers under the conditions and/or restrictions indicated by the rules of the license and/or other rules of the service provider. The policy management module 626 may generate policy templates based on license contracts provided by the third party device 640. The policy management module 626, the authorization module 628 and/or the CAM module 630 may then fill in parameters of the policy template based on the customer, the customer profile, the POP devices, etc. The policy templates, rules, and/or conditions are propagated to systems of the headend 606 and/or to other headends.

The DRM module 634 also receives the policy templates, rules and/or conditions and performs digital rights management and enforces the rules and conditions in collaboration with the authorization module 628, the IT module 636, the STMS billing module 638 and the CAM module 630. The DRM 634 interacts with the service provider 608, the authorization module 628, and the POP Devices 602. This assures that usage of content by a customer is within the bounds of the original license contract and satisfies the rules of the service provider 608. The authorization module 628 determines (i) days and times for each of the policies and corresponding content, and (ii) whether requests for the content received from the POP devices 602 are authorized or not based on the conditions in the policies, parameters received from the POP devices, and/or other parameters stored at the headend. The parameters received and stored at the headend may include any of the parameters and/or characteristics disclosed herein and pertaining to the POP devices, corresponding customers and/or users, service provider parameters, content parameters, etc. Some example parameters and characteristics are a type of POP device, a location of a POP device, an operating system of a POP device, an age of customer, whether the customer has paid for the content, a service provider ID, a third party ID, a period of time or type of use of the content, etc. Thus, the authorization module 628 determines whether a user is able to receive particular content at a particular POP device based on one or more rules associated with that content. The authorization module 628 provides the content to the content locker 632 if the corresponding request is authorized.

The IT module 636 is a source of information for program authorization as performed by the authorization module 628. The authorization module 628 performs authorization checks for a user based on the information received from the IT module 636. The information may include billing information indicating whether the user has paid for the requested content. The information may indicate a subscriber's (or user's) standing in terms of whether the subscriber has paid for the content and/or whether the subscriber typically pays for content on time. The information thus indicates whether the user is permitted to purchase, receive and/or view the content based on the user's status.

The authorization module 628 generates a modified customer event signal that is transmitted to the DRM module 634 and/or the IT module 636. The IT module 636 updates a record for the user for that particular event (or request of content) in response to the modified customer event signal. The event, for example, may be a movie, a video-on-demand, a pay-per-view event, etc.

Information and conditions that specify a policy of content being provided to the content locker 632 are represented in either a conditional access packet generated by the CAM module 630 and/or a DRM license signal. The conditional access packet as shown and/or the DRM license signal is securely transmitted to the appropriate POP devices, which then enforce the conditions in terms of playback, not playback, and deletion of content on the POP devices. The conditional access packets indicate to the POP devices if and when the content received and/or stored on the POP devices can be played out.

Upon acquisition of an offer by a customer and at the request for viewing access to the content, the policy instance associated to the offer, which is maintained in the content locker 632, is examined and enforced by the authorization module 628 (sometimes referred to as the offer enforcing module). This occurs prior to granting access to playback of the content on a POP device of the customer. The authorization module 628 performs the evaluation of an offer policy instance against a set of content and consumer related attributes available in other systems such as user profiles, target device profiles, geographical locations, content owners, availability, viewing windows, etc. The authorization module 628 may "unlock" access rights for and/or on the POP device and/or other POP devices of the customer upon a purchase if permitted by the policy via the content lockers 622, 632. This capability is referred to as global unlock for enabling a common authorization of entitlement across multiple playback devices.

Figure 8:
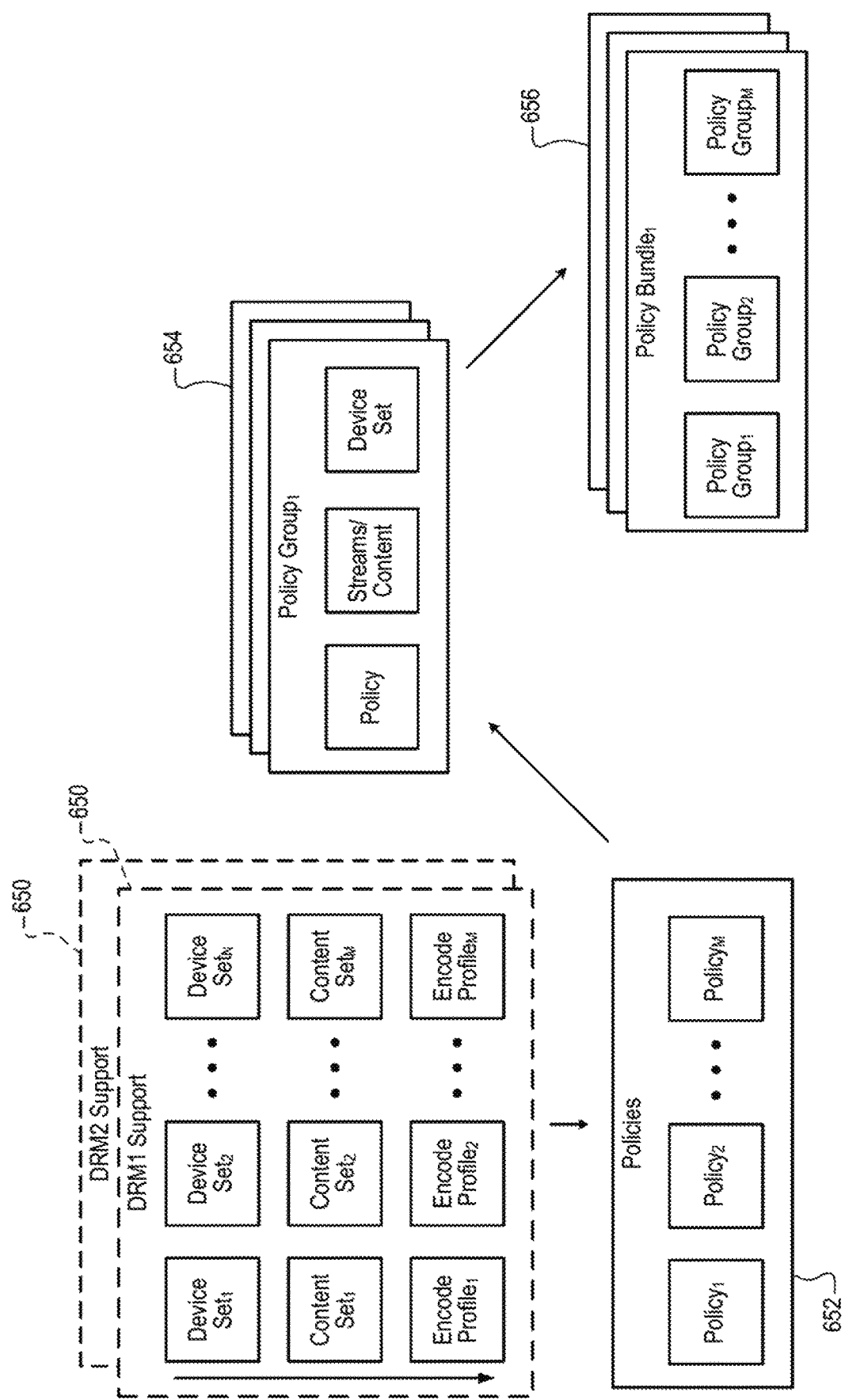
FIG. 8 is a block diagram illustrating policy bundle formation in accordance with the present disclosure.

FIG. 8 illustrates policy bundle formation. FIG. 8 shows (i) DRM support types 650 for different device sets, content sets, encode profiles, (ii) policies 652, (iii) policy groups 654, and (iv) policy bundles 656. The device sets (sets of POP devices) are created and segmented. The POP devices are grouped for each customer, which may be based on classifications of the POP devices. Following the creation and segmenting of the devices sets, the content sets are created and/or setup. The content sets are encoded and stored for access by customers. The content may be encoded and stored in a digital format for access by authorized customers. The content may be stored in different formats, compression rates, and/or for different playout bit rates.

Following setup of the encode sets, encode profiles are setup. The encode profiles include transmission rates of the corresponding content in the encode sets. Each encode profile may have a transmission rate. Some example rates are 250 kilo-bits per second (kbps), 500 kbps, 800 kbps, 1500 kbps, 2500 kbps, 50 mega-bps (used for 4K applications due to high resolution of 4K). Following setup of the encode sets policies may be created as shown. The policies may be respectively for different types of offers, products and/or content, POP devices, and customers. The policies may be for VOD, EST, 4K, etc.

FIG. 8 depicts creation of a policy bundle and procedural components involved. A policy bundle may include a mixed variety of policy groups that represent specifically designated offers with respective limits (e.g., DRM structure, targeted devices, customer technical capabilities, etc.). A policy group includes one or more policies, target devices (or device set), and media elements (or streams and/or content). Each policy group may include individualized elements that represent targeted designations of an offer. To create a policy group, a targeted audience device set is evaluated, based on an input from a non-ubiquitous content/devices project. The device set and corresponding characteristics correlate to targeted transcoding profiles. The target transcoding profiles are identified in the setup of the transcode/encode sets, which in consequence are reflected in set-up of a transcode profile set.

Each policy group may include a single DRM policy that is designated for a specific group targeted use case. The DRM policy is included in addition to other policy elements that are dictated by the use of systems in a supply chain. DRM and policy elements from various DTV systems in the supply chain are encapsulated into a single policy profile within a policy group. The policy profiles can be shared among various policy groups and, therefore, among policy bundles. This described approach provides flexibility of inclusion of elements within a system, where the elements are not dictated at the time of policy creation. These elements, if not recognized by an inbound processing system or module, are passed through as is and unaltered for use by the processing modules that are able to parse through such elements and provide necessary enforcement. An example of an inbound processing module is the authorization module 628 of FIG. 7.

Figure 9:
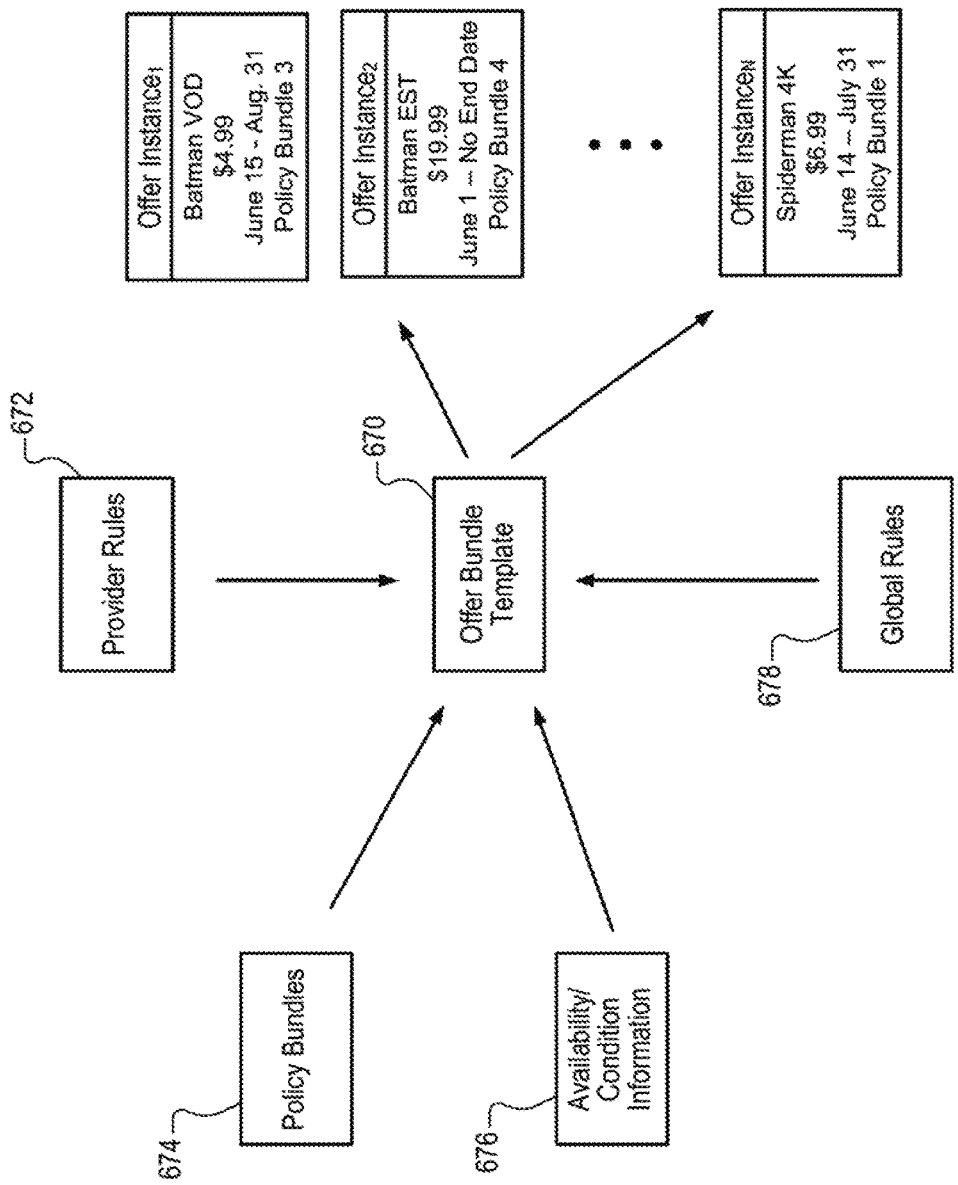
FIG. 9 is a block diagram illustrating offer template/bundle formation in accordance with the present disclosure.

FIG. 9 illustrates offer template/bundle formation. An offer template/bundle 670 is shown. The offer template/bundle may include one or more offer templates. The one or more offer templates are generated based on information, such as provider rules 672, policy bundles 674, availability/condition information 676, and global rules 678. The provider rules 672 (or service provider rules) may include provider rules that are not encapsulated in a policy and that do not have to do with entitlement. For example, a provider rule may be directed to the license of a movie by a service provider, where the service provider does not make an offer of a third party available during a holiday. During the holiday, the movie may not be made available for purchase or rent under conditions of a third party offer because the service provider may play out the movie or sell the movie on, for example, Blu-ray® discs based on different offer conditions. The provider rule may be directed to whether an offer is made available and usage of the content provided by the offer.

Each of the one or more offer templates may include one or more offer instances, where each of the offer instances includes one or more offers and corresponding conditions. An offer may be a multi-tier offer including one or more offers that are dependent on other offers. The offer instances indicate the content being offered, whether the offer is VOD, EST or other type of offer, price, availability dates, playback dates, end dates, policy bundle number, etc.

An offer template bundle may be a reusable component to spawn off other offer instances. The offer template bundle includes provider properties (e.g., provider rules), policy bundles, global properties (e.g., global rules), and window information (e.g., availability periods, playback times, and/or other times). The global properties may be applicable to all POP devices of a customer, in a building, in a particular network, of a certain type, in a certain geographical location, etc. The global properties may be directed to all content, content of a certain category, content provided in a certain geographical location, content provided to certain customers, etc. Provider properties are slated to allow differentiated flexibility for provider specific contract enablement details, such as allowing some content to be seen on limited sets of devices or resolution restrictions, etc. Policy bundles are designed to provide control over a behavior of content (how the content is used) for a targeted device set. That is, providing the necessary granularity of the device set intended for bundling under a variety of limitations and conditions.

Global properties represent a common set of properties that are applicable across a variety of elements, which may include various rules and policies. If an element of a global property exists locally and is depicted in a name value pair, then a local rule takes precedence over the global property. Name value pair is how conditions and/or rules are represented in a policy. For example, available time, as part of window information, is an indicator of when a media asset (feature, episode, etc.) is permitted to be viewed and when the permitted viewing expires. This may be per contract obligations with legal party of ownership.

Figure 10:
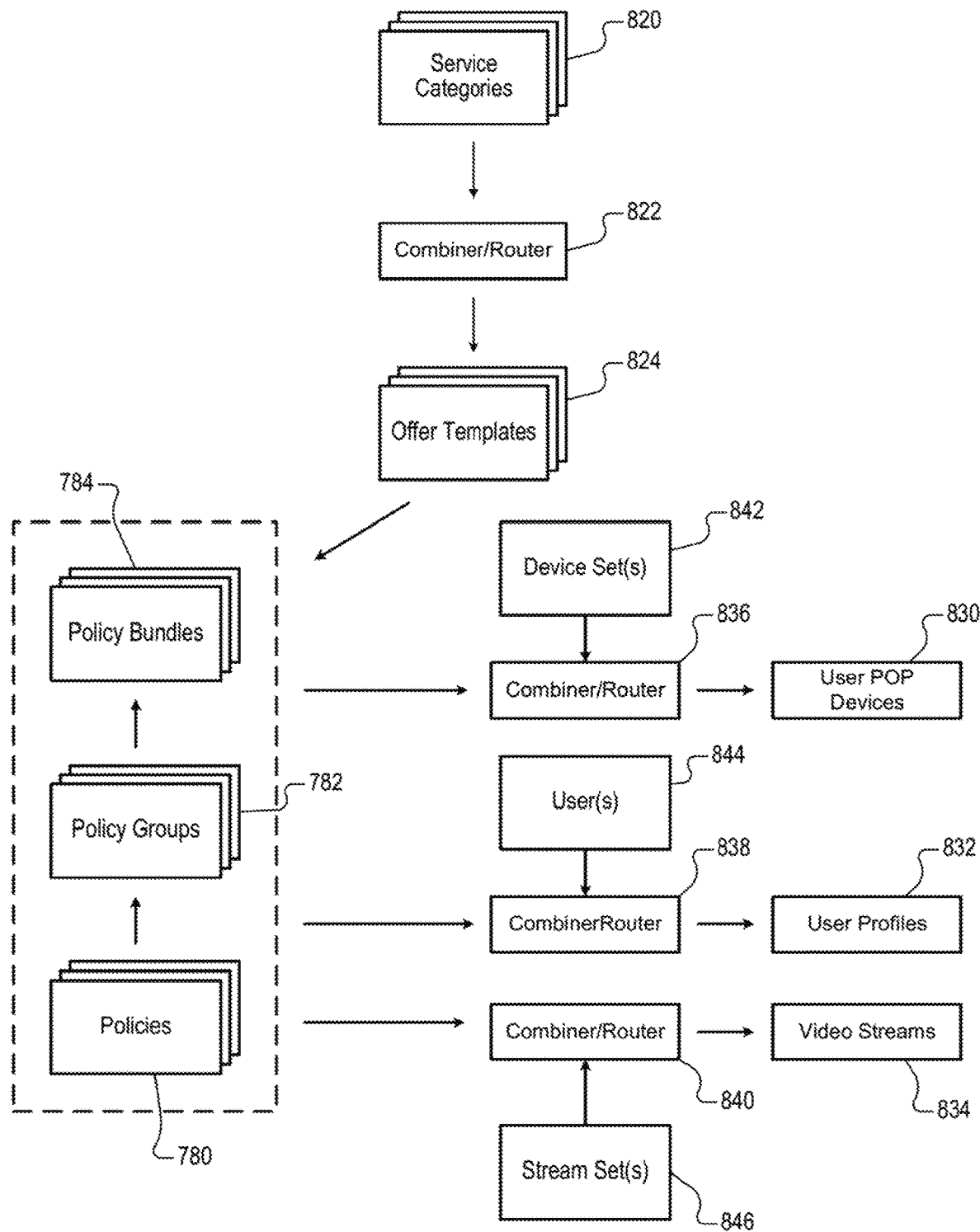
FIG. 10 is a block diagram illustrating distribution of policies, policy groups, and policy bundles in accordance with the present disclosure.

FIG. 10 illustrates distribution of policies 780, policy groups 782, and policy bundles 784. A policy may be directed to particular content and dictates the entitlement and permitted usage of that content. The usage refers to: a number of times the content may be viewed, dates the content may be viewed, permitted locations of viewing, permitted POP devices on which the content may be viewed, whether the content is licensed to and/or owned by a customer allowing up to unlimited viewing times, and/or other usage information. A policy encapsulates all of the rules associated or particular to certain content. The content may have a particular title, group title, bundle title, and/or other identification. A policy has one or more corresponding offers, which may include conditions and/or rules which are implemented according to the policy. The conditions and/or rules included in and/or implemented according to the policy may have a hierarchy with respect to which conditions and/or rules are to be followed over other conditions and/or rules. For example, one condition or rule may override another conflicting condition and/or rule. An example hierarchy is shown in FIG. 11.

Figure 11:
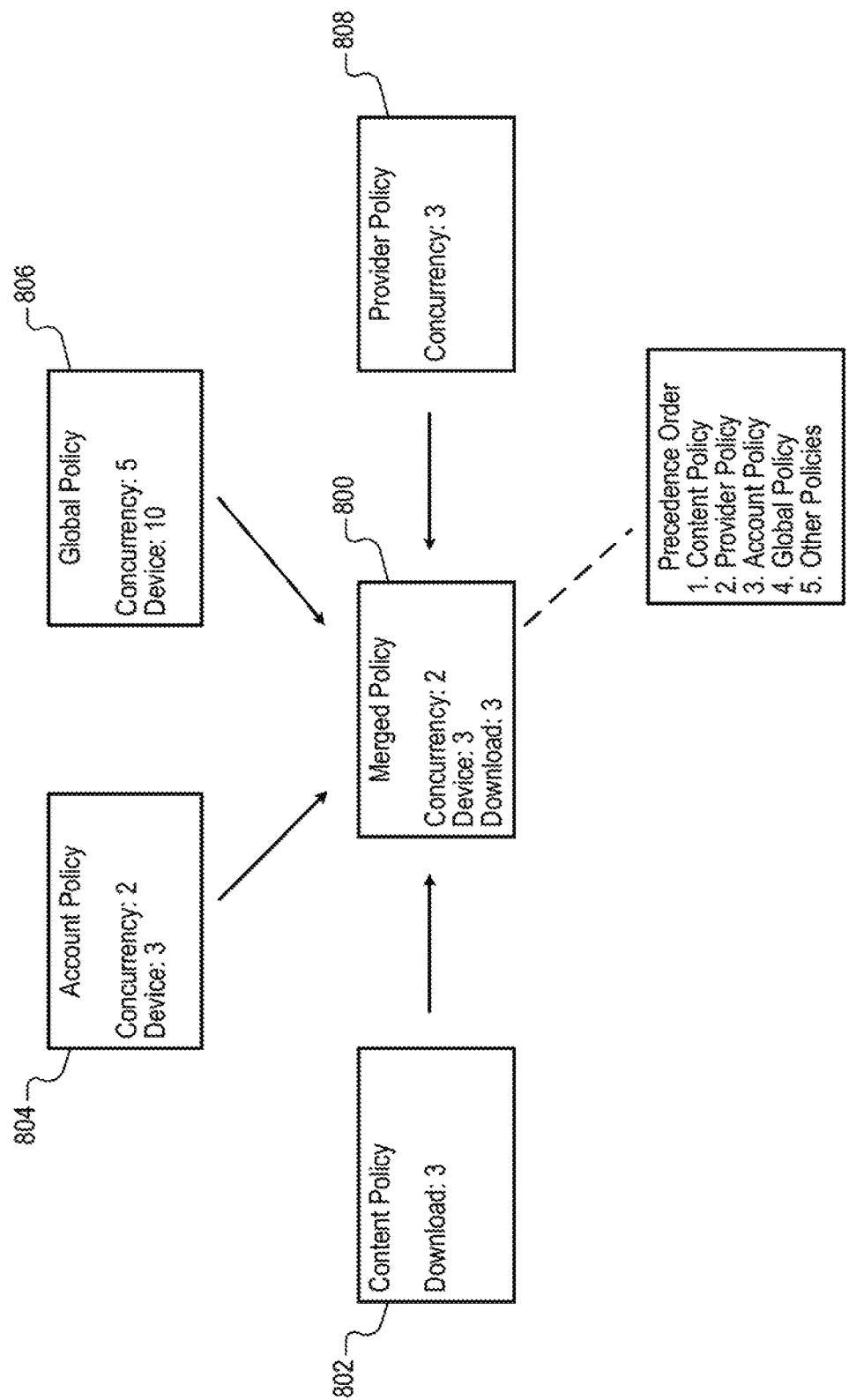
FIG. 11 is a block diagram illustrating a policy merger and a policy hierarchy in accordance with the present disclosure.

FIG. 11 shows a policy merger and a policy hierarchy. A headend and/or POP device may distribute and display content according to a merged policy 800. The merged policy 800 may be generated based on one or more other policies, which are combined and interpreted in predefined precedence (or hierarchical) orders. A policy may be provided for a particular customer or group of customers and may be based on a status, classification and/or category of the account and/or accounts associated with the customers. As an example, a particular policy may be provided for a customer or user having a classification, a particular account status, and/or a particular category of content. As another example, a policy may be more global and be directed to any number of customers and/or users, any number of account statuses, and/or any number of content categories. The conditions and rules of a policy may be based on a license agreement for content, contractual rights, business drivers, or other market specific drivers.

The merger of policies may be performed by the policy management module 626 of FIG. 7 and/or by one of the POP devices 602. The other policies may include a content policy 802, an account policy 804, a global policy 806, and a provider policy 808. Any key and/or restriction can be applied at any level (global, account, provider, or content levels) without needing explicit coding to for support. The key referring to an order of events or steps followed for a policy. For example a policy may be provided as and/or implemented according to a configuration file having a set of rules, conditions and/or parameters that are to be applied in a predetermined order. The configuration file may be continuously and/or periodically updated based on changing, new and/or expired conditions and/or rules. Certain conditions and/or rules may be dependent on other conditions and/or rules.

There may be no restriction for particular content or a variety of different restrictions may be implemented for the content. If there is no restriction, the content may be copied, providing to different users (i.e. replicating the content), and/or viewed any number of times. Restrictions may restrict copying, providing the content to other users, limit view times and periods, and/or how the content is used. The more restrictive the usage, in general, the less expensive the corresponding offer. The policies may be updated without need for updating or providing new programming code by updating parameter values in the corresponding configuration files.

New restrictions and rules may be added by creating a new name value pair. For example, if 4K streaming is offered only for in-home streaming, a new name value pair called "proximity" may be added to an application being executed on a POP device, which records a result of a proximity check. A new offer may be created via a content management system with a rule that checks for "proximity=='I'". No additional head-end changes are required to support this feature. Where property "proximity" is considered to be a unique key and "I" is considered to be its acceptable and respective value, in the Name/Value association. Each key is uniquely mapped to a respective one or more systems. An authentication module (or enforcing system) determines, via a dictionary of keys, the one or more capabilities each of the keys correlates to. This may be based on associated mappings, which are indicated in the dictionary of keys.

Each of the policies 802, 804, 806, 808 may include a concurrency value, a POP device value, a download value, and/or other values. The concurrency value may identify a number of conditions and/or rules of the policy that should be implemented concurrently. The download value may identify a number of times a policy has been downloaded, updated, changed, and/or implemented. The POP device value may indicate a type or types and/or geographical locations of POP devices for which the policy is to implement. The content policy 802 includes conditions and/or rules for particular content. The content may be of different type (e.g., premium content, entertainment content, standard content, etc.). For example, the conditions and/or rules may prevent certain POP devices and/or users from accessing and viewing the content. The content policy may include conditions and/or rules for permitting certain POP devices and/or users to access and/or view the content during certain dates, viewing times, and may require a key and/or passcode for accessing and/or viewing. The account policy 804 includes conditions and/or rules directed to the status of a customer account, a classification (or standing) of a user, etc. The global policy 806 includes conditions and/or rules applicable to one or more groups of POP devices. The provider policy 808 includes conditions and/or rules associated with a service provider and/or a third party provider.

As shown, the policies that are merged to provide the resulting merged policy may be merged based on a hierarchical order. This order may be predetermined and may be based on a hierarchical ranking of the type of policy (content, account, global, provider), age of the policy, origin of the policy, etc. Although a certain (first) type of policy may have a higher ranking than another (second) type of policy, a condition and/or a rule of the second type of policy may have a higher ranking and/or may be implemented prior to a condition and/or a rule of the first type of ranking.

Referring again to FIG. 10, in which relationship associations between policies and POP devices, users, and video streams, FIG. 10 may be implemented by the policy management module 626 of FIG. 7. As stated above, a policy represents the conditions and rules for usage and access to content. An offer refers to some of the conditions for obtaining permitted usage and/or access to the content. For each offer there is a corresponding policy. The content to be viewed may be provided by a package of television programming channels. In FIG. 10, service categories 820 are shown. A service category may refer to a type or manner in which content is purchased and viewed. Some examples of different types of viewing are VOD, EST, PPV, download and go (DNG), or other type of viewing. DNG refers to the capability for POP devices of customers to download and display movies and shows offline while on the go or traveling overseas.

A service category may be created based on polices, rules, conditions and capabilities. A service category may include any of the following examples (and is not limited to the following examples): 48 hour VOD with or without DNG; 48 hour VOD available only on mobile devices; 72 hour VOD with or without DNG; EST with or without DNG; 4K on STBs but only HD/SD on mobile devices with or without DNG; and non-transactional content available for streaming with or without DNG. Once a service category is created, a content policy services system (e.g., the content policy services system 623 of FIG. 7) may generate the offers tied to the correct rules as file based content is delivered by a service provider and/or third party device.

One or more of the service categories may be combined or routed by a combiner and/or router 822 and/or related to one or more offer templates 824. A particular offer may be associated with multiple service categories. For example, an offer may be "if you buy two VODs, you get a third VOD free" or "if you subscribe to a HBO channel, you get two HBO movies for free". One or more of the offers may be temporary and may expire after a predetermined period of time. Each of the policy bundles includes two or more of the policy groups 782. Each of the policy groups 782 includes two or more of the policies 780. One or more of each of the policies 780, policy groups 782, or policy bundles 784 may be provided, implemented for, and/or related to one or more user POP devices 830, user profiles 832, and/or video streams 834. Combiners/routers 836, 838, 840 are provided to show relationships of policies, policy groups, policy bundles to (i) device sets 842 as implemented for the user POP devices 830, (ii) the user profiles 832 as implemented for user(s) 844, and (iii) the stream set(s) 846. Each of the device sets 842 includes a set of devices having one or more common characteristics. Each of the stream sets includes multiple video streams (e.g., programming channels, movies, etc.). The video streams may be stored on a local drive or played back from a data center (e.g., a data center having the content locker 622 of distributed cache 604 of FIG. 7), a server in a cloud network, or a headend. Bits of the streams may be transmitted via the Internet to the appropriate POP devices. For example, IPhones® are a set of mobile devices. Various types of policies may exist, some examples are a 24 hour viewing policy, a 30 day only policy, an iOS® policy, an Android® policy, a STB policy, etc. Different permutations of different policies may be provided and/or combined and may be implemented based on a hierarchical ranking of conditions, rules, and/or policies.

Figure 12:
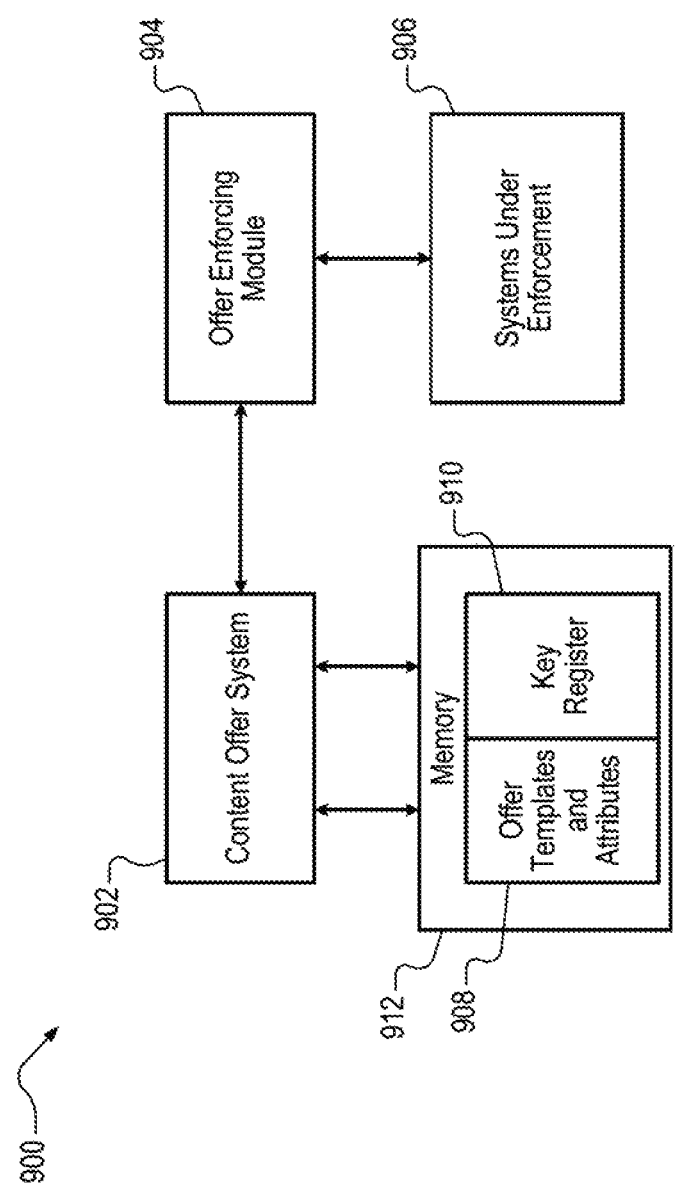
FIG. 12 is a functional block diagram of an offer distribution system in accordance with the present disclosure.

FIG. 12 shows an offer distribution (or name value pair) system 900 that includes a content offer system 902, an offer enforcing module 904, and systems under enforcement 906. The content offer system 902 may refer to the headend 606, service provider 608 and/or third party device 640 of FIG. 7. The offer enforcing module 904 may refer to one or more of the modules 628, 630, 634, 636, 638 of FIG. 7. The systems under enforcement 906 may refer to systems operating in the POP devices 602, the distributed cache 604, the central cache 624, and/or other Internet and/or headend devices and/or modules enforcing policies.

A name value pair (NVP) method may be performed to define variables, values, conditions and rules that are to be enforced by devices in the content offer system 902. The devices are designed to handle and interpret data associated with these variables, values, conditions and rules. The conditions and rules may be interpreted and enforced by any one or more of the devices, not just the authentication module 628 and/or modules of a service provider. Any of the devices may contribute variables, values, conditions and/or rules that are to be used in enforcement of the corresponding policies. The devices and/or modules of the content offer system 902 cooperate with the offer enforcing module 904 to conduct the following: create offers, register offer attributes (key, value, and validation method), search offers and attributes, inactivate offers, instantiate offers to the offer enforcing module 904, create and store (e.g. register) keys and their respective value associations for all systems that are used during implementation of the name value pair method. The offer templates and attributes 908 may be stored in memory 910, which is accessible to the devices and/or modules in the content offer system 902. The keys and respective values may be stored in a key register 910 of the memory 912.

The content offer system 902 creates, manages, edits and publishes offers throughout an infrastructure of a headend. An offer template may be created including conditions and parameters. The parameters may be defined by corresponding attributes. The offer template including the conditions and attributes is stored in the memory 912. The offer template may be created as a draft and when ready to be implemented may be registered to one or more of the systems within the content offer system 902 and published for use. The offer(s) associated with the offer template are then sent out to POP devices.

Figure 13:
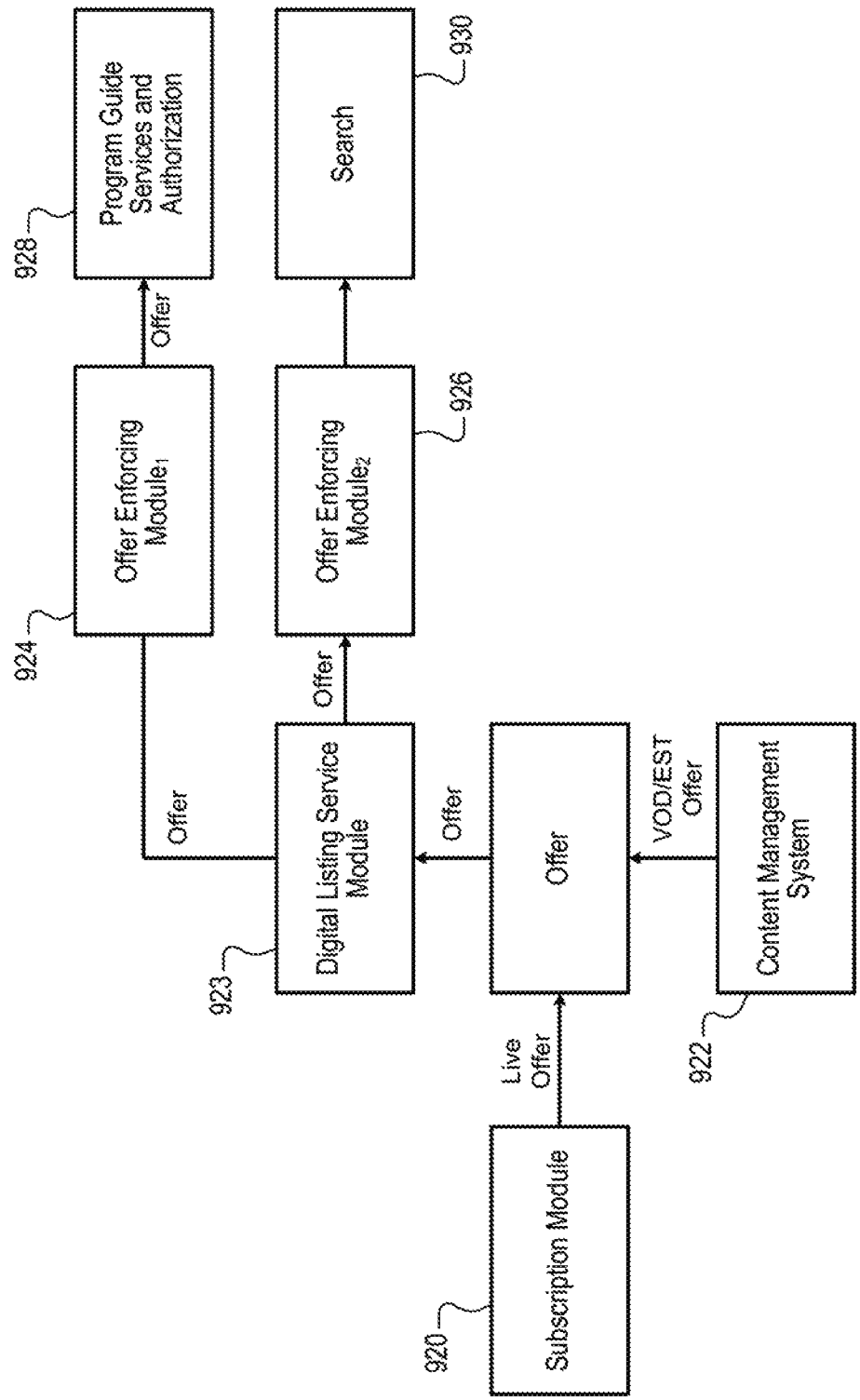
FIG. 13 is a block diagram illustrating offer distribution in accordance with the present disclosure.

FIG. 13 illustrates offer distribution. An offer is an artifact of what is to be offered to a consumer for purchase. The offer may be for one or more movies or a combination of channels of movies. The policy management module 626 (or a subscription module 920 of the policy management module 626) may create and source the offer. This subscription module 920 has the information about the subscription of the user. An example subscription is to 100 standard channels and a predetermined number of premium channels, such as HBO®, Showtime®, etc. These are referred to as live and/or linear channels, which broadcast content. As another example, a user may have a subscription for non-linear assets, which may be provided by a content management system 922. Non-linear assets may refer to a specific movie or a show or combination of movies and shows that are purchased, such as VOD or EST movies. Especially if you are buying to own, purchasing to own, like buying a DVD or Blu-ray® disc. Instead of a user having the media on a physical DVD or Blu-ray® disc, the user has essentially purchased rights to view the movie indefinitely. However, there may be limits on how the movie is viewed (e.g., can only be viewed on certain POP devices). This restricts replicating the movie and/or providing the movie to other users, unlike a DVD or Blu-ray® disc that may be copied. As an example, the movie may be limited to be downloaded to no more than 5 POP devices and the POP devices need to have certain predetermined characteristics.

The offers may be provided to a digital listing service module 923 which may be implemented in a headend. The digital listing service module 923 forwards the offers to offer enforcing modules 924, 926. The provisioning of entitlement and enforcement of content is getting more and more complex. The examples disclosed herein provide systems and methods for handling this complex landscape by creating and implementing policy templates. Complex relationships between different aspects are included in the policies. Relationships between device types, users, and assets are created and intersections between these aspects are covered by the policies. This provides multi-dimensional relationships (or intersections) of entitlement attributes and POP device characteristics. Example dimensions are a POP device dimension, an asset (or content) dimension, and a people (or customer) dimension, a service provider dimension, and a content provider dimension. The relationships are enforced by the offer enforcing modules 924, 926, which may be located in the headend and/or a service provider. The first offer enforcing module 924 may provide program guide services and authorization, represented by box 928. The offers may be presented in a program guide and/or when clicking on items listed in the program guide. The second offer enforcing module 926 may search a content locker of a customer to determine if requested content has already been downloaded and/or purchased and is accessible to the customer. This is represented by box 930.

Program guide service authentication performed by the enforcing module 926 may be responsible for playing and/or presenting an offer through a program guide. The offer is displayed on a POP device as part of the program guide or in a separate window. Offers, that are available to the user of the POP device and for which content is capable of being displayed on the POP device or other POP device of the user, are displayed on the POP device. The search, represented by the search box 930, is initiated by an application running on a POP device and is performed by the enforcing module 926, which presents conditions of the offers presented to the user. The search performed may be a function of the application executed on the POP device. The user selects an offer. The POP device initiates the search. The enforcing module 926 searches for conditions and/or details pertaining to the offer being searched. The conditions and details are displayed to the user on the POP device.

Figure 14:
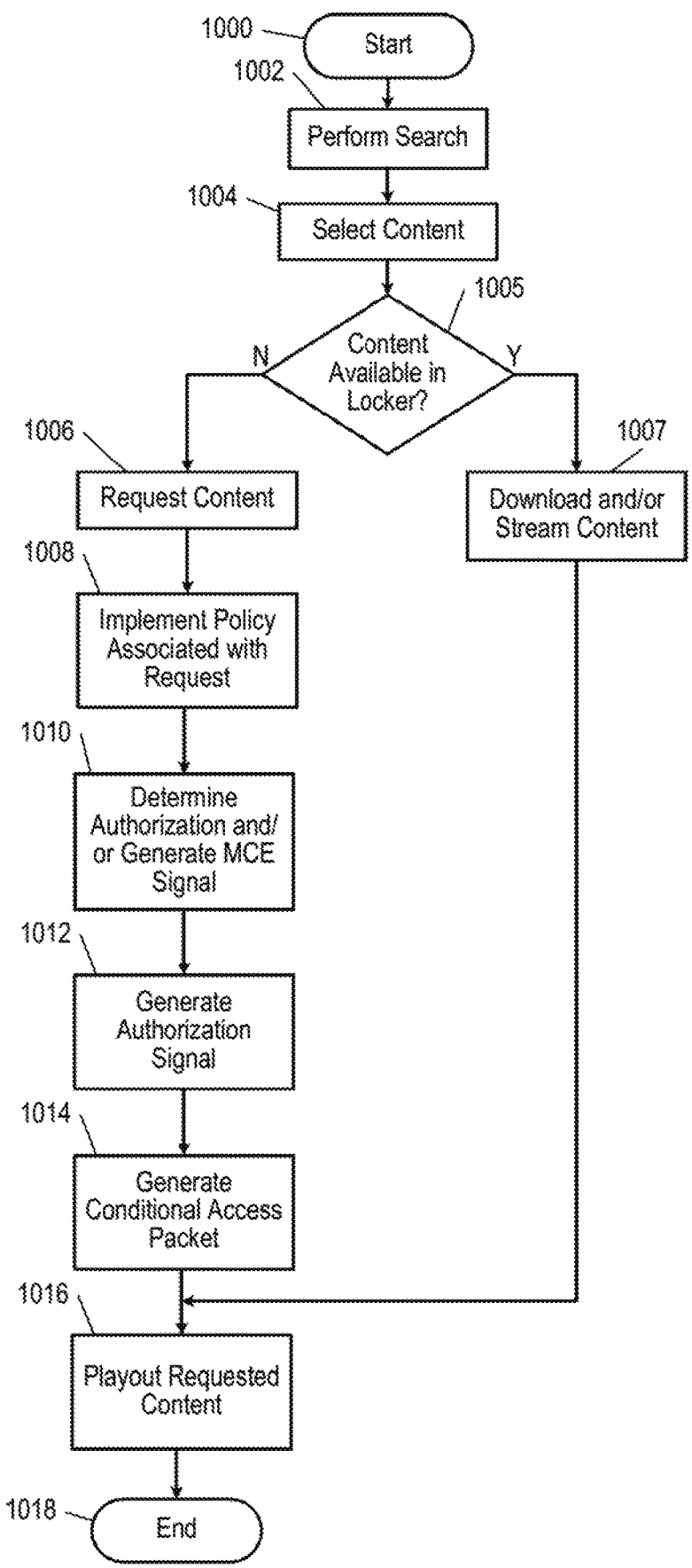
FIG. 14 illustrates a content distribution method in accordance with the present disclosure.
Figure 15:
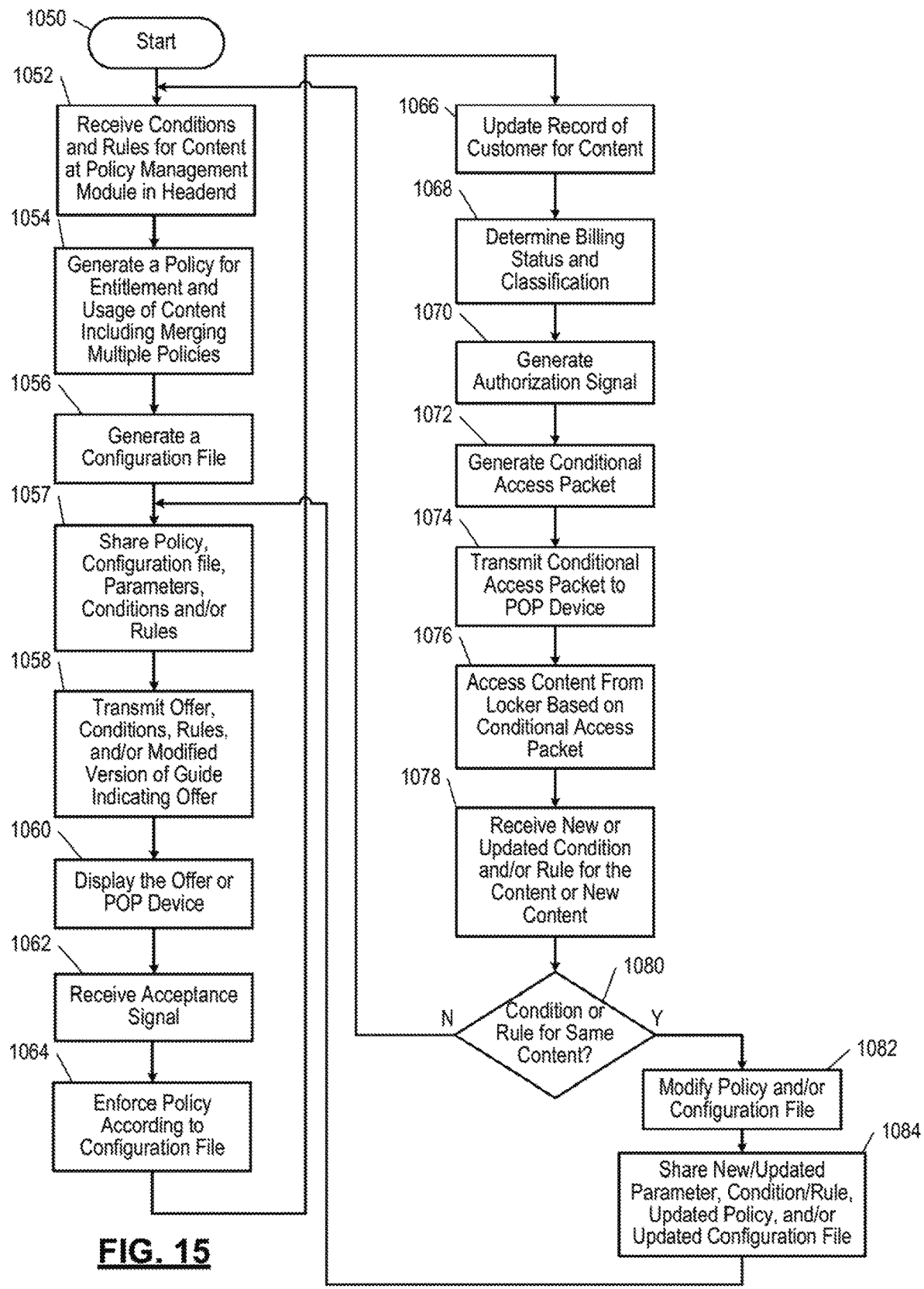
FIG. 15 illustrates a policy management method in accordance with the present disclosure.

For further defined structure of the modules of FIGS. 1-13 see below the provided methods of FIGS. 14-15 and below provided definition for the term "module". The systems disclosed herein may be operated using numerous methods, example methods are illustrated in FIGS. 14-15. In FIG. 14, a content distribution method is shown. Although the following tasks are primarily described with respect to the implementation of FIG. 7, the tasks may be easily modified to apply to other implementations of the present disclosure. The tasks may be iteratively performed.

The method may begin at 1000. At 1002, a user via a POP device queries an application of the POP device for content. This may include the POP device displaying one or more guides and/or search windows and receiving inputs from the user for selected content. A listing of already downloaded content and/or content stored in a locker (e.g., one of the lockers 622, 624 of FIG. 7) for the user. The POP device may search through a catalogue of offers, channels, movies, etc. The catalogue may include a list of movies to purchase and/or rent, periods of purchase and/or rental, prices, availability dates, etc. The user may search through different pay-per-view events.

At 1004, the user selects content to purchase and/or rent. This includes the POP receiving an input from the user and the POP generating a request signal and transmitting the request signal to the distributed cache 604 and/or the headend 606.

At 1005, if the content is available to purchase or rent and/or is already in the user's content locker, then task 1006 is performed. If content is in the content locker, then 1007 may be performed and the content may be downloaded and/or streamed to the POP device. Task 1016 may be performed subsequent to task 1007.

At 1006, the POP communicates with the distributed cache and/or headend to request the content be stored in the user's locker and/or transmitted to the POP. The requesting and storing of the requested content may include purchasing a movie (traditionally provided on a digital versatile disc (DVD)) and storing the movie in the locker.

At 1008, the headend 606 receives the request and the policy management module 626 implements a policy associated with the requested content, as described above.

At 1010, the authorization module 628 determines whether the user and/or POP are authorized to receive and/or view the requested content as described above. If the user is not authorized and/or the corresponding POP device is incapable of displaying the requested content, then the authorization module may generate a response signal and forward the response signal to the POP device. The response signal indicates that the user is not authorized and/or the POP device is not able to display the selected content. The authorization may be determined by one or more of the modules 634, 636, and/or 638 and/or based on information received at the authorization module from one or more of the modules 634, 636, 638. The information may include status, standing, billing, and/or other information directed to the user, the POP device, and/or the requested content. The authorization module 628 may generate a modified customer event (MCE) signal, as described above with respect to FIG. 7.

At 1012, the DRM module 634, IT module 636, and/or STMS billing module 638 based on the MCE signal, generates an authorization signal AUTH indicating whether the user and/or POP is authorized to receive and/or view the content, as described above.

At 1014, the CAM module 630 generates a conditional access packet based on the authorization signal AUTH received from the service provider 608. The conditional access packet may be transmitted from the CAM module 630 to the POP. The conditional access packet may indicate the restrictions of usage, viewing, copying, etc. The content may be downloaded to the user's locker during any of tasks 1006, 1008, 1010, 1012 and 1014. In one implementation, the content is downloaded to the locker prior to authorization. In another implementation, the content is downloaded to the locker if authorization is provided. The content may be downloaded and/or streamed to the POP device during any of tasks 1010, 1012 and 1014 if the user and/or POP device is authorized to receive the content. At 1016, the POP device may display (or playout) the requested content on the POP device. The method may end at 1018.

FIG. 15 shows a policy management and offer distribution method. The method may begin at 450. At 1052, the policy management module 626 of the headend 606 of FIG. 7 receives conditions and rules for content from a service provider or a third party device.

At 1054, the policy management module 626 generates, for one or more POP devices of a customer, a policy for entitlement and usage of content including merging conditions and rules of policies to generate a resulting policy. The resulting policy is generated based on a predetermined hierarchy of policies. See above provided description for the merged policy of FIG. 11.

At 1056, the policy management module 626 generates a configuration file including conditions or condition based parameters for the merged policy. The configuration file may include the conditions, the rules and/or the parameters. The parameters may be in the form of metadata. One or more key/value pairs may be created, as described above.

At 1057, the policy management module 626 may share the policy, conditions, rules, and/or configuration file with one or more devices, modules, and/or systems within the headend 606 and/or one or more of the POP devices 602.

At 1058, the policy management module 626 may transmit to the POP device (i) an offer for the content, (ii) conditions and/or rules of the offer, and/or (iii) a modified guide indicating the offer. At 1060, the POP device presents the offer for the content to the customer or user of the POP device. At 1062, the policy management module 626 receives an acceptance signal from the POP device indicating acceptance of the offer.

At 1064, the authorization module 628 enforces the policy according to the configuration file, as described above. The authorization module 628 may generate a MCE signal and transmit the MCE signal to the IT module 636. At 1066, the IT module 636 updates a record of the customer for the content based on the MCE signal. At 1068, the IT module 636 or authorization module 628, subsequent to updating the record, determines a billing status and a classification of the customer.

At 1070, the IT module 636 or the authorization module 628 generates an authorization signal to authorize access or usage of the content based on the billing status, the classification of the customer, and whether the conditions and/or parameters are satisfied. Determination of whether the conditions and/or parameters have been satisfied may be determined by any one or more of the modules 628, 634, 636, 638. Although shown as separate modules, two or more of the modules 628, 634, 636, 638 and 630 may be combined and implemented as a single module within the headend 606 or the service provider 608. At 1072, the conditional access management module 630 generates a conditional access packet in response to the authorization signal.

At 1074, the headend 606 transmits the conditional access packet to the POP device. At 1076, the POP device accesses the content from the content locker 622 based on the conditional access packet. The content locker 622 is allocated to the customer and is separate from the POP device. The content locker 622 may be located outside a local area network in which the POP device is located. At 1078, the policy management module 626 receives a new or updated condition or rule for the content and/or new content.

At 1080, the policy management module 626 determines whether the new or updated condition or rule is for the content and/or for new content. Task 1052 may be performed if the new condition or rule is for new content. Task 1082 may be performed if the new condition or rule is for the previous content. Task 1052 and 1082 may be performed if the new condition or rule applies to new content in addition to the previous content.

At 1082, the policy management module 626 modifies the policy and/or the configuration file for the previous content based on the new and/or updated condition or rule. This may simply include updating or changing one or more parameters in the configuration file or may be more complex and include adding or changing one or more conditions and/or rules. One or more key/value pairs may be created, modified, removed and/or added.

At 1084, the policy management module 626 shares the new or updated condition and/or rule for the previous content, the updated policy, and/or the modified configuration file with devices, modules, and/or systems within the headend 606. Task 1058 may be performed subsequent to task 1084 to present an offer based on the new and/or updated condition and/or rule.

Different POP devices may connect to and disconnect from the network at any moment in time during the above method. The POP device connected to the network may receive the latest versions of the offers for the content.

The above-described tasks of FIGS. 14-15 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-disclosed content providers, headends, service providers, advertisers, product and/or service providers, payment service providers and/or backend devices may include and/or be implemented as respective servers. The servers may include respective control modules for performing one or more of the corresponding tasks and/or functions disclosed herein.

The wireless communications described in the present disclosure with respect to Bluetooth transceivers of user receiving devices and mobile devices may include transmission of data and/or signals having short-wavelength ultra-high frequency (UHF) radio waves in an industrial, scientific and medical (ISM) radio frequency band from 2.4 to 2.485 GHz. The signals may be transmitted based on Bluetooth protocols and/or standards. The signals may be transmitted based on Bluetooth low energy (or smart) protocols and/or standards. The Bluetooth transceivers may include respective antennas.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

A content or service provider is also described herein. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure the transfer of video, programs, or channel information may include and is not limited to the transfer of data, content, information, programs, movie trailers, movies, advertising, assets, video data, etc.

As used herein, the term "title" will be used to refer to, for example, a movie itself and not the name of the movie. While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method of provisioning multi-dimensional rule based entitlement, the method comprising:
   storing, within a headend, a plurality of conditions and rules for content;
   merging at least some of the plurality of conditions and rules to generate a plurality of policies for entitlement and usage of content for a customer device based on a predetermined hierarchy of the plurality of policies, wherein rules and conditions of the policy for entitlement and usage of content are multi-dimensional to include a customer dimension, a customer device dimension, and a provider dimension;
   generating, within the headend, a configuration file including the plurality of conditions or condition based parameters for the policies for entitlement and usage;
   updating the configuration file in response to a change in the conditions or rules;
   allowing the conditions or rules to change at any time without needing explicit coding at the headend for supporting the change;
   communicating an offer for the content from the headend to the customer device;
   communicating an acceptance signal indicating acceptance of the offer from the customer device to the headend;
   receiving the acceptance signal at the headend from the customer device;
   enforcing, at the headend, the policies for entitlement and usage of content according to the configuration file by determining whether the rules and conditions of the policies for entitlement by the customer and customer device have been met; and
   thereafter, based on enforcing, enabling access to content.

2. The method of claim 1, further comprising:
   subsequent to receiving the acceptance signal, updating a record of the a customer for the content; and
   subsequent to updating the record, and prior to communicating the content, generating an authorization signal to authorize access to the content based on whether the plurality of conditions or parameters of the configuration file are satisfied.

3. The method of claim 2, further comprising determining a billing status of the customer and a classification of the customer, and wherein generating the authorization signal comprises generating the authorization signal based on the billing status and classification of the customer.

4. The method of claim 2, further comprising:
   subsequent to updating the record, generating a conditional access packet in response to the authorization signal; and
   transmitting the conditional access packet from the headend to the customer device, wherein the customer device accesses the content from a content locker based on the conditional access packet, and wherein the content locker is allocated to the customer and is separate from the customer device.

5. The method of claim 4, wherein the content locker is outside a local area network in which the customer device is located.

6. The method of claim 1, further comprising:
   receiving, at the headend, a new or updated parameter, a new or updated condition, or a new or updated rule for the content;
   modifying the configuration file for the content based on the new or updated parameter, the new or updated condition or the new or updated rule to form a modified configuration file; and
   sharing the new or updated parameter, the new or updated condition or the new or updated rule for the content or the modified configuration file with a plurality of network devices and systems within the headend.

7. The method of claim 6, further comprising;
   modifying the configuration file according to only the new or updated parameter; and
   replacing one of the condition based parameters by the new or updated parameter.

8. The method of claim 6, wherein the new or updated parameter, the new or updated condition or the new or updated rule for the content is shared with a plurality of network devices and systems within the headend.

9. The method of claim 6, wherein the modified configuration file is shared with the plurality of network devices and systems within the headend.

10. The method of claim 1, further comprising:
receiving a request for second content from the customer device;
determining whether the second content is in a content locker of the customer, wherein the content locker is located outside a local area network of the customer device;
if the second content is in the content locker and the customer is authorized to view the second content, downloading the second content from an Internet or the headend to the customer device; and
if the second content is not in the content locker, implementing the policies for entitlement and usage of content or a second merged policy to determine whether to permit access to the second content to the customer.

11. A system for provisioning multi-dimensional rule based entitlement, the system comprising:
a customer device;
a headend configured to store a plurality of conditions and rules for content, merge at least some of the conditions and rules to generate a plurality of policies for entitlement and usage of content for the customer device based on a predetermined hierarchy of the plurality of policies, wherein rules and conditions of the policies for entitlement and usage of content are multi-dimensional to include a customer dimension, a customer device dimension, and a provider dimension, generate a configuration file including the plurality of conditions or condition based parameters for the policies for enforcement and usage, and update the configuration file in response to a change in the conditions or rules;
allowing the conditions or rules to change at any time without needing explicit coding at the headend for supporting the change; an authorization module configured to communicate an offer for the content to the customer device;
the customer device receiving the offer for the content and communicating an acceptance signal to the authorization module;
said authorization module configured to receive the acceptance signal;
a conditional access management module configured to enforce the policies for entitlement and usage of content according to the configuration file enabling access to content from the customer device; and
said customer device configured to access content in response to enforcement of the policies.

12. The system of claim 11, further comprising a billing module, wherein:
the authorization module is configured to, subsequent to receiving the acceptance signal, generate a modified customer event signal to update a record of the customer for the content; and
the billing module is configured to, subsequent to updating the record, and prior to the content being communicated, generate an authorization signal to authorize access to the content based on whether the plurality of conditions or parameters of the configuration file are satisfied.

13. The system of claim 12, wherein the billing module is configured to determine a billing status and classification of the customer and generate the authorization signal based on the billing status and classification of the customer.

14. The system of claim 12, wherein:
the conditional access management module is configured to, subsequent to the authorization module updating the record, generate a conditional access packet in response to the authorization signal and transmit the conditional access packet from the headend to the customer device, wherein the customer device accesses the content from a content locker based on the conditional access packet, and wherein the content locker is allocated to the customer and is separate from the customer device.

15. The system of claim 14, wherein the content locker is outside a local area network in which the customer device is located.

16. The system of claim 11, wherein the headend is configured to:
receive a new or updated parameter, a new or updated condition, or a new or updated rule for the content;
modify the configuration file for the content based on the new or updated parameter, the new or updated condition or the new or updated rule to form a modified configuration file; and
share the new or updated parameter, the new or updated condition or the new or updated rule for the content or the modified configuration file with a plurality of network devices and systems within the headend.

17. The system of claim 16, wherein;
the headend is configured to is configured to modify the configuration file according to only the new or updated parameter; and
one of the condition based parameters is replaced by the new or updated parameter.

18. The system of claim 16, wherein the headend is configured to share the new or updated parameter, the new or updated condition or the new or updated rule for the content with the plurality of network devices and systems within the headend.

19. The system of claim 16, wherein the headend is configured to share the modified configuration file with the plurality of network devices and systems within the headend.

20. The system of claim 11, wherein:
the headend is configured to receive a request for second content from the customer device;
an authorization module is configured to determine whether the second content is in a content locker of the customer, wherein the content locker is located outside a local area network of the customer device;
the headend or the authorization module is configured to, if the second content is in the content locker and the customer is authorized to view the second content, download the second content from an Internet or the headend to the customer device; and
the headend or the authorization module is configured to, if the second content is not in the content locker, implement the policies for entitlement and usage of content or a second merged policy to determine whether to permit access to the second content to the customer.

* * * * *